(12) United States Patent
Damnjanovic et al.

(10) Patent No.: US 11,463,886 B2
(45) Date of Patent: Oct. 4, 2022

(54) RADIO (NR) FOR SPECTRUM SHARING

(71) Applicant: QUALCOMM Incorporated, San Diego, CA (US)

(72) Inventors: Aleksandar Damnjanovic, Del Mar, CA (US); Tamer Kadous, San Diego, CA (US); Yongbin Wei, La Jolla, CA (US); Xiaoxia Zhang, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/949,389

(22) Filed: Oct. 28, 2020

(65) Prior Publication Data
US 2021/0044982 A1 Feb. 11, 2021

Related U.S. Application Data

(62) Division of application No. 16/395,888, filed on Apr. 26, 2019, now Pat. No. 10,848,978.
(Continued)

(51) Int. Cl.
*H04W 16/14* (2009.01)
*H04W 72/04* (2009.01)
(Continued)

(52) U.S. Cl.
CPC ....... *H04W 16/14* (2013.01); *H04W 72/0453* (2013.01); *H04W 74/0808* (2013.01);
(Continued)

(58) Field of Classification Search
CPC . H04W 16/14; H04W 16/10; H04W 72/0453; H04W 72/1289; H04W 74/0808;
(Continued)

(56) References Cited

U.S. PATENT DOCUMENTS

2016/0088487 A1 3/2016 Yu et al.
2016/0135057 A1 5/2016 Wang et al.
(Continued)

FOREIGN PATENT DOCUMENTS

WO 2017023370 A1 2/2017

OTHER PUBLICATIONS

International Search Report and Written Opinion—PCT/US2019/029543—ISA/EPO—dated Jun. 27, 2019.

*Primary Examiner* — Farid Seyedvosoghi
(74) *Attorney, Agent, or Firm* — Liem T. Do

(57) ABSTRACT

Wireless communications systems and methods related to coordinating shared radio resources for spectrum sharing are provided. A spectrum resource control unit allocates a first resource for exclusive access by a first network operating entity in a spectrum. The exclusive access is configured for at least one of a network information communication or a feedback communication. The spectrum resource control unit allocates a second resource in the spectrum for shared access by the first network operating entity and a second network operating entity. The shared access is configured for at least a downlink control information communication. The spectrum resource control unit transmits, to the first network operating entity and the second network operating entity, a configuration indicating the first resource allocated for exclusive access by the first network operating entity and the second resource allocated for shared access by the first network operating entity and the second network operating entity.

20 Claims, 12 Drawing Sheets

Related U.S. Application Data

(60) Provisional application No. 62/664,528, filed on Apr. 30, 2018.

(51) Int. Cl.
*H04W 74/08* (2009.01)
*H04W 56/00* (2009.01)
*H04W 84/04* (2009.01)
*H04L 1/18* (2006.01)
*H04M 1/724* (2021.01)
*H04M 1/72403* (2021.01)

(52) U.S. Cl.
CPC ........... *H04L 1/1812* (2013.01); *H04M 1/724* (2021.01); *H04M 1/72403* (2021.01); *H04W 56/0015* (2013.01); *H04W 84/042* (2013.01)

(58) Field of Classification Search
CPC ............ H04W 56/0015; H04W 84/042; H04L 1/1812; H04L 5/0053; H04L 5/0032; H04L 5/005; H04L 5/0051; H04L 5/0055; H04M 1/724; H04M 1/72403
See application file for complete search history.

(56) References Cited

U.S. PATENT DOCUMENTS

| | | |
|---|---|---|
| 2016/0373935 A1 | 12/2016 | Smith et al. |
| 2017/0086077 A1 | 3/2017 | Teng et al. |
| 2017/0188241 A1 | 6/2017 | Mueck et al. |
| 2017/0230951 A1 | 8/2017 | Xiong et al. |
| 2017/0290023 A1 | 10/2017 | Zhu et al. |
| 2017/0311173 A1* | 10/2017 | Zhou .................. H04W 72/048 |
| 2017/0318470 A1 | 11/2017 | Srikanteswara et al. |
| 2018/0206214 A1* | 7/2018 | Bendlin .............. H04W 72/042 |
| 2018/0368199 A1 | 12/2018 | Zeng et al. |
| 2019/0320435 A1* | 10/2019 | Yu ..................... H04W 72/1289 |
| 2019/0335337 A1 | 10/2019 | Damnjanovic et al. |
| 2020/0021998 A1 | 1/2020 | Baldemair et al. |

\* cited by examiner

RADIO (NR) FOR SPECTRUM SHARING

CROSS REFERENCE TO RELATED APPLICATIONS

The present application is a divisional application of U.S. patent application Ser. No. 16/395,888, filed Apr. 26, 2019, which claims priority to and the benefit of U.S. Provisional Patent Application No. 62/664,528, filed Apr. 30, 2018, each of which is hereby incorporated by reference in its entirety as if fully set forth below and for all applicable purposes.

TECHNICAL FIELD

This application relates to wireless communication systems, and more particularly to coordinating shared radio resources for spectrum sharing.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Coordination of resource usages among different operating entities can be important for spectrum sharing.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes allocating, by a spectrum resource control unit, a first resource for exclusive access by a first network operating entity in a spectrum shared by the first network operating entity and a second network operating entity, the exclusive access configured for at least one of a network information communication or a feedback communication; allocating, by the spectrum resource control unit, a second resource in the spectrum for shared access by the first network operating entity and the second network operating entity, the shared access configured for at least a downlink control information communication; and transmitting, by the spectrum resource control unit to the first network operating entity and the second network operating entity, a configuration indicating that the first resource is allocated for exclusive access by the first network operating entity and the second resource is allocated for shared access by the first network operating entity and the second network operating entity.

In an additional aspect of the disclosure, a method of wireless communication includes receiving, by a first wireless communication device, a configuration indicating a first resource and a second resource in a spectrum shared by a first network operating entity and a second network operating entity, the first resource allocated for exclusive access by the first network operating entity and the second resource allocated for shared access by the second network operating entity, the first wireless communication device associated with the first network operating entity; communicating, by the first wireless communication device with a second wireless communication device, at least one of network information or a feedback using the first resource; and transmitting, by the first wireless communication device, downlink control information to reserve the second resource.

In an additional aspect of the disclosure, an apparatus includes a processor configured to allocate a first resource for exclusive access by a first network operating entity in a spectrum shared by the first network operating entity and a second network operating entity, the exclusive access configured for at least one of a network information communication or a feedback communication; and allocate a second resource in the spectrum for shared access by the first network operating entity and the second network operating entity, the shared access configured for at least a downlink control information communication; and a transceiver configured to transmit, to the first network operating entity and the second network operating entity, a configuration indicating that the first resource is allocated for exclusive access by the first network operating entity and the second resource is allocated for shared access by the first network operating entity and the second network operating entity.

In an additional aspect of the disclosure, an apparatus includes a transceiver configured to receive a configuration indicating a first resource and a second resource in a spectrum shared by a first network operating entity and a second network operating entity, the first resource allocated for exclusive access by the first network operating entity and the second resource allocated for shared access by the second network operating entity, the apparatus associated with the first network operating entity; communicate, with a wireless communication device, at least one of network information or a feedback using the first resource; and transmit downlink control information to reserve the second resource.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments. It should be understood that such exemplary embodiments can be implemented in various devices, systems, and methods.

DETAILED DESCRIPTION

Figure 1:
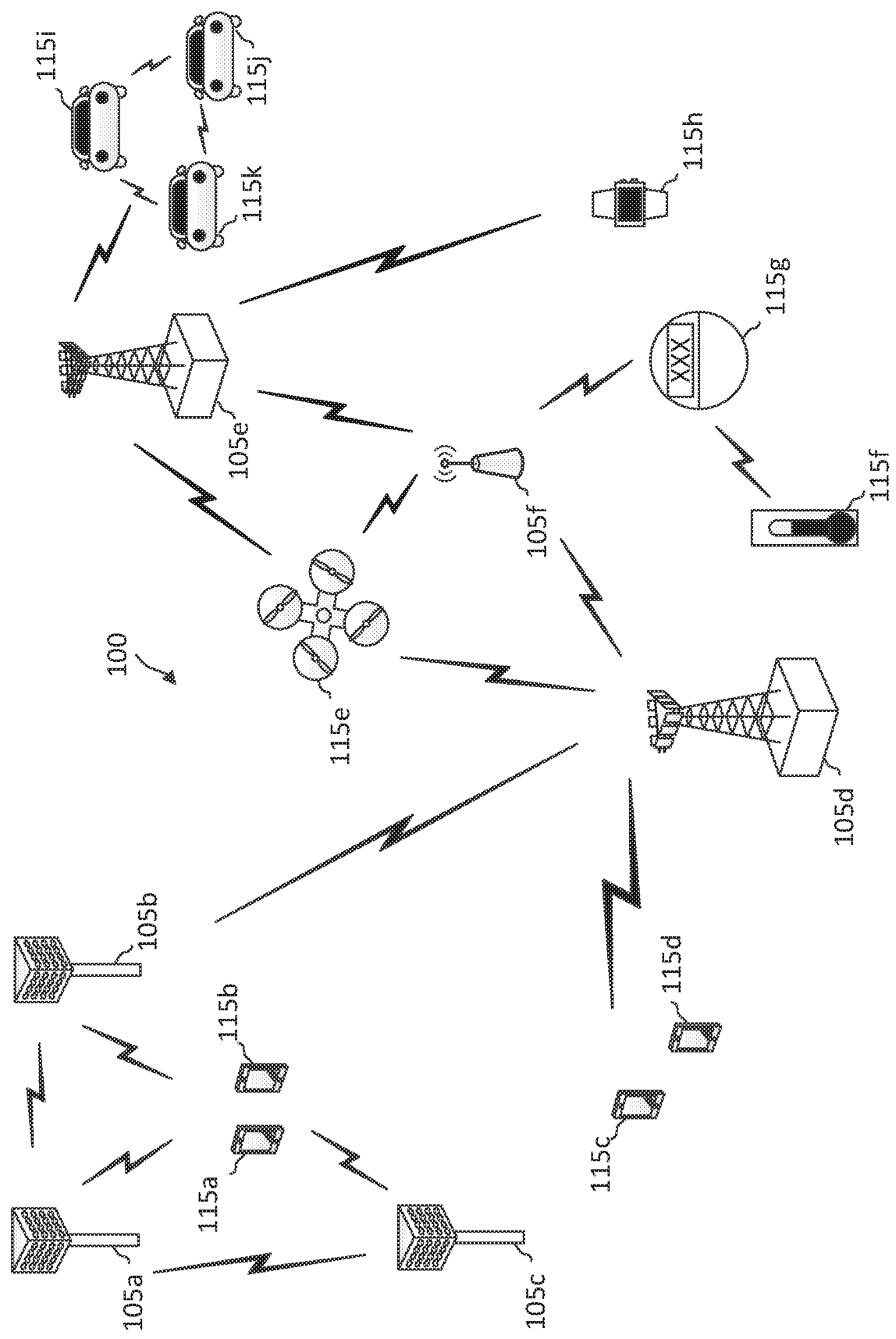
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time period (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like BW. For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for coordinating shared radio resources for spectrum sharing. The disclosed embodiments may employ a spectrum resource control unit for the coordination. The coordination can be among priority access license (PAL) users and/or general authorized access (GAA) users. For sharing among PAL users, the spectrum resource control unit can assign each PAL operator with exclusive access resources and prioritized shared access resources. An exclusive access resource is a guaranteed resource for exclusive access by a corresponding assigned PAL operator. The spectrum resource control unit can configure the assigned PAL operator to communicate time-critical channels and signals (e.g., network information signals and feedback signals) using the exclusive resource. The spectrum resource control unit can assign each PAL operator with an access priority for each prioritized shared access. Thus, a low-priority PAL operator may monitor the prioritized shared access resource for a reservation from a higher priority PAL operator and may only access the resource opportunistically when the higher priority operator does not utilize the resource.

In an embodiment, to enable NR Release 15 devices to support spectrum sharing, the spectrum resource control unit can coordinate resources (e.g., the exclusive access resources) for transmissions of NR Release 15 signals, such as synchronization signal blocks (SSBs), system information (SI), paging, random-access channel (RACH) signals, hybrid automatic repeat request (HARQ) and channel state information (CSI) feedbacks, which may have critical timing constraints. In addition, the spectrum resource control unit can coordinate the use of NR Release 15 signals, such as downlink control information (DCI), demodulation reference signal (DMRS), channel state information-reference signal (CSI-RS), and/or sounding reference signal (SRS) for channel reservation requests and/or channel reservation responses for the prioritized shared access.

In an embodiment, for sharing among GAA users, the spectrum resource control unit can assign each GAA operator with exclusive access resources but may allocate shared access resources for contention-based shared access by all GAA operators.

Aspects of the present application can provide several benefits. For example, the reuse of NR Release 15 signals and messages as channel reservations and/or responses allow the deployment of spectrum sharing among NR Release 15 devices without introducing new messages and/or new channel signals. The scheduling of the exclusive access resources can enable timing-critical signals and/or applications to meet timing constraints. The disclosed embodiments are suitable for use with any types of wireless communication technologies. For example, the disclosed embodiments can enable spectrum sharing among NR Release 15 devices using signals and/or messages as defined in the NR Release 15. The disclosed embodiments can be applied to future NR Releases to provide system performance improvements.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource configuration (RRC) information related to random-access channel (RACH) procedures, paging, control resource set (CORESET) for physical downlink control channel (PDCCH) monitoring, physical uplink control channel (PUCCH), physical uplink shared channel (PUSCH), power control, SRS, and cell barring. After obtaining the MIB, the RMSI and/or the OSI, the UE 115 can perform a random-access procedure to establish a connection with the BS 105. After establishing a connection, the UE 115 and the BS 105 can enter a normal operation stage, where operational data may be exchanged.

In some embodiments, the UEs 115 and the BSs 105 may be operated by multiple network operators or network operating entities and may operate in a shared radio frequency spectrum, which may include licensed or unlicensed frequency bands. For example, in the network 100, the BS 105a and the UE 115a may be associated with one network operating entity, while the BS 105b and the UE 115b may be associated with another network operating entity. To support coordinated access of the shared spectrum, a BS 105 or an entity of the core network 130 may act as a central arbitrator to manage access and coordinate the partitioning of resources among different network operating entities operating within the network 100. In some embodiments, the central arbitrator may include a spectrum access system (SAS).

Figure 2:
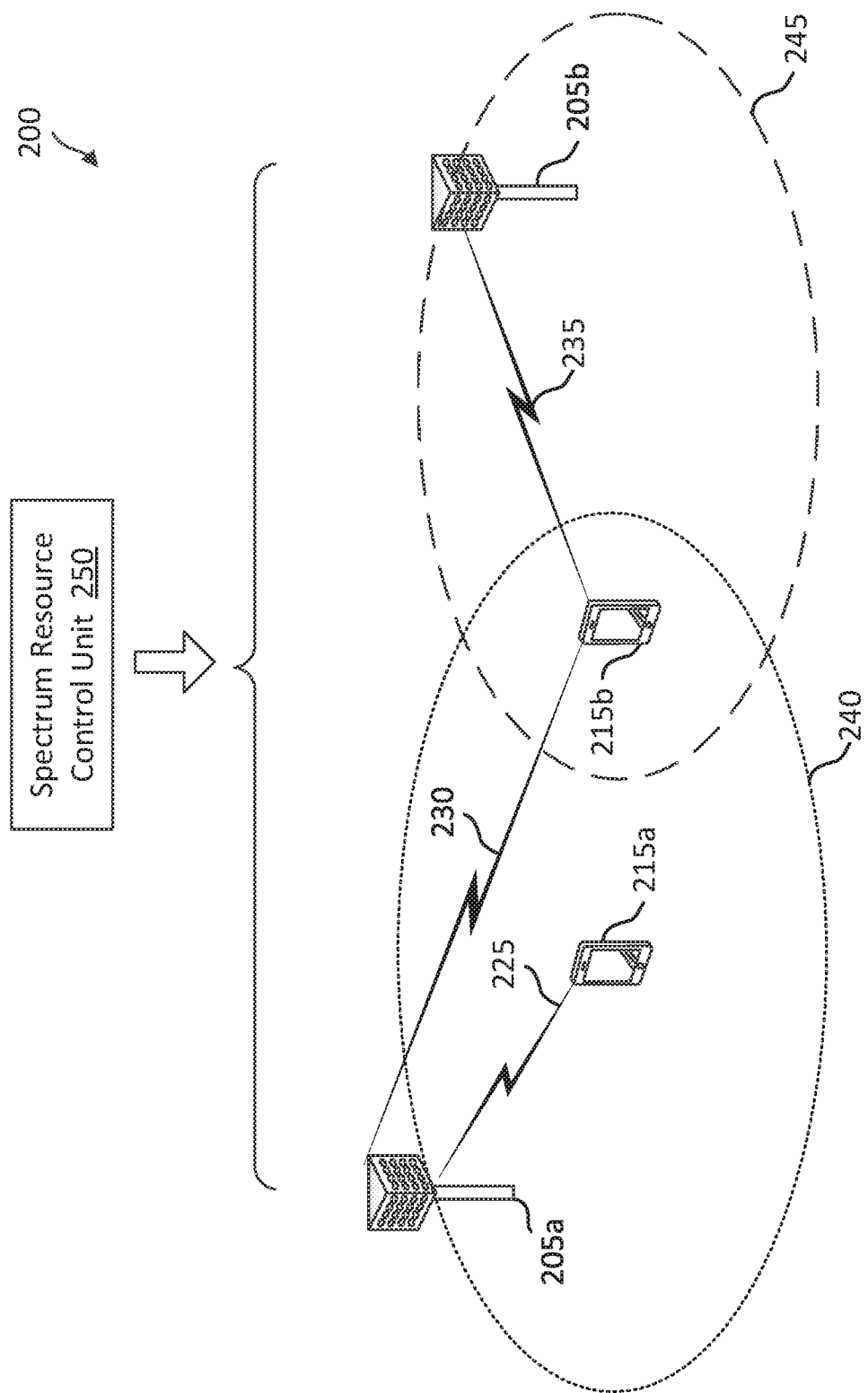
FIG. 2 illustrates an example of a wireless communications network that supports spectrum sharing among multiple operators according to some embodiments of the present disclosure.

FIG. 2 illustrates an example of a wireless communications network 200 that supports spectrum sharing among multiple operators according to some embodiments of the present disclosure. The network 200 corresponds to a portion of the network 100. FIG. 2 illustrates two BSs 205 and two UEs 215 for purposes of simplicity of discussion, though it will be recognized that embodiments of the present disclosure may scale to many more UEs 215 and/or BSs 205. The BSs 205 are similar to the BSs 105. The UEs 215 are similar to the UEs 115. The BS 205a and BS 205b may communicate with the UEs 215 or other wireless devices within their respective coverage areas 240 and 245. The UEs 215 and the BS 205 may communicate with each other over a shared frequency band.

In the network 200, the BS 205a may be operated by one or more network operating entities. For example, the BS 205a may be operated by a first network operating entity to communicate with the UE 215a via a communication link 225, and the BS 205a may be operated by a second network operating entity to communicate with the UE 215b via a communication link 230. Similarly, the BS 205b may also be operated by one or more network operating entities. In some embodiments, the BS 205b is operated by a third network operating entity to communicate with the UE 215b via communication link 235. In this embodiment, the UE 215b may be configured to operate with both the second and third network operating entities.

In an embodiment, the shared frequency band can be within a 3.5 GHz Citizens Broadband Radio Service (CBRS) spectrum. Federal Communication Commission (FCC) defines a three-tier priority access model for sharing in the CBRS spectrum. The first tier with the highest priority may include pre-existing incumbents, such as radars. The second tier may include priority access license (PAL) users. The third tier with the lowest priority may include general authorized access (GAA). The network 200 may employ a spectrum resource control unit 250 to coordinate the sharing in the CBRS spectrum. The spectrum resource control unit 250 can be similar to a CBRS server or an SAS. The spectrum resource control unit 250 may communicate with the BSs 205 over wireless links or backhaul links (e.g., optical links).

In an embodiment, the first network operating entity and the second network operating entity may be PAL users and may be deployed using NR Release 15 technology. The spectrum resource control unit 250 may allocate two types of resources, exclusive resources and shared resources, in the spectrum to the first network operating entity and the second network operating entity. The exclusive resources can be used for communicating critical overhead signals and channels, such as SSBs, SIs, paging, physical random-access channel (PRACH) resources, hybrid automatic request (HARQ) acknowledgement/negative-acknowledgements (ACK/NACKs), channel state information (CSI) reporting, and/or critical quality-of-service (QoS) applications. The shared resources can be prioritized among the PAL users. For example, the spectrum resource control unit 250 can assign a higher access priority to the first network operating entity than to the second network operating entity for a particular shared resource. Thus, the first network operating entity may have priority in accessing the particular shared resource, while the second operating entity may opportunistically access the shared resource when the resource is not access by the first network operating entity.

In an embodiment, the first network operating entity and the second network operating entity may be GAA users and may be deployed using NR Release 15 technology. Similar to the PAL users, the spectrum resource control unit 250 may allocate two types of resources, exclusive or guaranteed resources and shared resources, in the spectrum to the first network operating entity and the second network operating entity. However, the shared resources are not prioritized. The first network operating entity and the second network operating entity access the shared resources based on listen-before-talk (LBT). In LBT, a transmitter node may perform sensing in a channel and ensure that the channel is clear before transmitting a message.

In an embodiment, the first network operating entity may be a PAL user and the second network operating entity may be a GAA user, where both entities may be deployed using NR Release 15 technology. The spectrum resource control unit 250 may allocate a first portion of the spectrum for PAL users and a second portion of the spectrum for GAA users.

Mechanisms for coordinating radio resources assignments and scheduling based on NR Release 15 messages or channels are described in greater detail herein.

Figure 3:
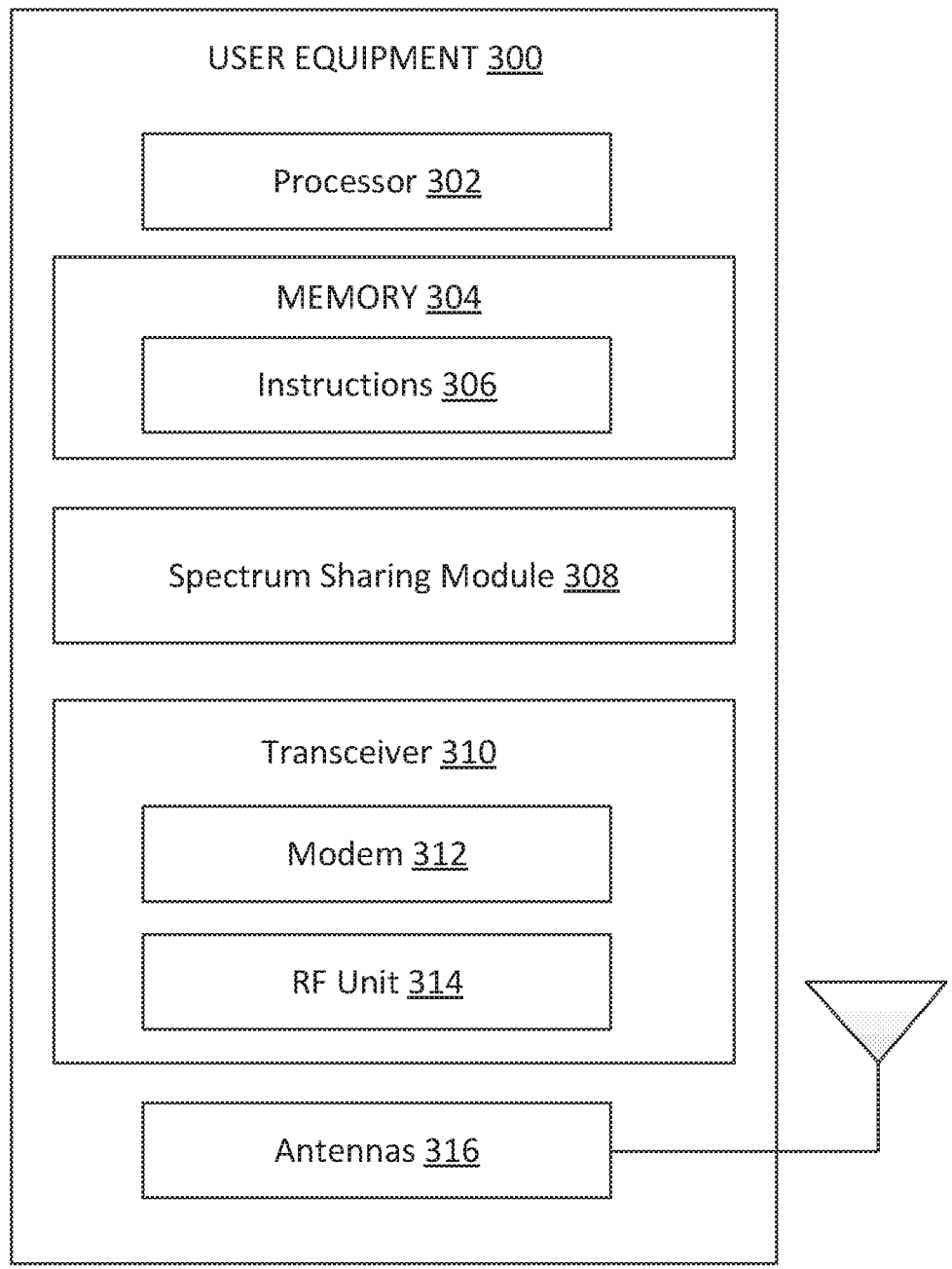
FIG. 3 is a block diagram of an exemplary user equipment (UE) according to some embodiments of the present disclosure.

FIG. 3 is a block diagram of an exemplary UE 300 according to embodiments of the present disclosure. The UE 300 may be a UE 115 or a UE 215 as discussed above in FIG. 1 or 2, respectively. As shown, the UE 300 may include a processor 302, a memory 304, a spectrum sharing module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random-access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 115 and 215 in connection with embodiments of the present disclosure, for example, aspects of FIGS. 6-10. Instructions 306 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The spectrum sharing module 308 may be implemented via hardware, software, or combinations thereof. For example, the spectrum sharing module 308 may be implemented as a processor, circuit, and/or instructions 306 stored in the memory 304 and executed by the processor 302. The spectrum sharing module 308 may be used for various aspects of the present disclosure, for example, FIGS. 6-10. For example, the spectrum sharing module 308 is configured to monitor for network information (e.g., SSBs, RMSI, and/or OSI) from a BS (e.g., the BSs 105), synchronize to the BS, monitor for scheduling information from the BS, and/or communicate with the BS according the scheduling information. The spectrum sharing module 308 can further monitor for a channel reservation (e.g., scheduling grants or sound reference signal (SRS) requests) from the BS, perform clear channel assessment (CCAs) by listening for transmissions from another UE (e.g., the UEs 115 and 300), respond to the BS's channel reservations by transmitting SRSs based on the results of the CCAs, as described in greater detail herein.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304, and/or the spectrum sharing module 308 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The antennas 316 may include multiple antennas of similar or different designs in order to sustain multiple transmission links. The RF unit 314 may configure the antennas 316.

Figure 4:
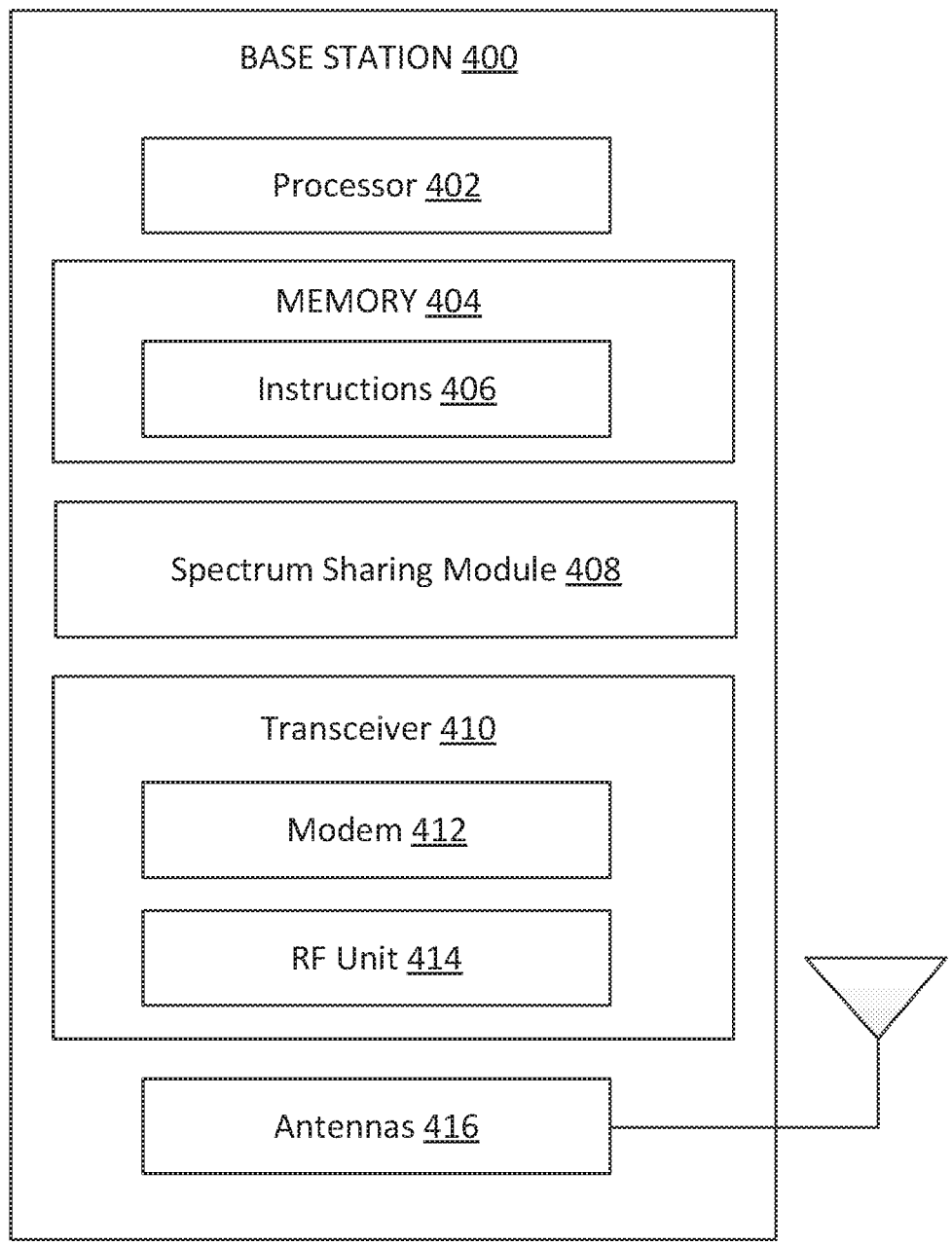
FIG. 4 is a block diagram of an exemplary base station (BS) according to some embodiments of the present disclosure.

FIG. 4 is a block diagram of an exemplary BS 400 according to embodiments of the present disclosure. The BS 400 may be a BS 105 or 205 as discussed above in FIG. 1 or FIG. 2, respectively. A shown, the BS 400 may include a processor 402, a memory 404, a spectrum sharing module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein, for example, aspects FIGS. 6-10 and 12. Instructions 406 may also be referred to as code, which may be interpreted broadly to include any type of computer-readable statement(s) as discussed above with respect to FIG. 3.

The spectrum sharing module 408 may be implemented via hardware, software, or combinations thereof. For example, the spectrum sharing module 408 may be implemented as a processor, circuit, and/or instructions 406 stored in the memory 404 and executed by the processor 402. The spectrum sharing module 408 may be used for various aspects of the present disclosure, aspects of FIGS. 6-10 and 12. For example, the spectrum sharing module 408 is configured to broadcast system information (e.g., SSBs, RMSI, and/or OSI), perform random-access procedures with UEs (e.g., the UEs 115), determine schedules for communicating with the UEs, and/or communicate with the UEs according to the determined schedules. The spectrum sharing module 408 can further receive a configuration from a spectrum controlling entity (e.g., the spectrum resource control unit 250 or a CBRS server) indicating exclusive resources and shared resources assigned to the BS 400, schedule and communicate timing-critical signals (e.g., SSBs, SI, paging, random-access, HARQ ACK/NACKs, CSI reports) with UEs using the exclusive resources, monitor the shared resources based on corresponding access priorities assigned to the BS 400, and/or schedule and communicate with the UEs using the shared resources, as described in greater detail herein.

As shown, the transceiver 410 may include the modem subsystem 412 and the RF unit 414. The transceiver 410 can be configured to communicate bi-directionally with other devices, such as the UEs 115 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or 300. The RF unit 414 may be further configured to perform analog beamforming in conjunction with the digital beamforming. Although shown as integrated together in transceiver 410, the modem subsystem 412 and the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115 or 300 according to embodiments of the present disclosure. The antennas 416 may further receive data messages transmitted from other devices and provide the received data messages for processing and/or demodulation at the transceiver 410. The antennas 416 may include multiple antennas of similar or different designs in order to sustain multiple transmission links. While not shown, in some embodiments, the BS 400 may further include a communication unit coupled to a network unit, such as a CBRS server or a spectrum resource control unit 250, which may configure the BS 400 for spectrum sharing.

Figure 5:
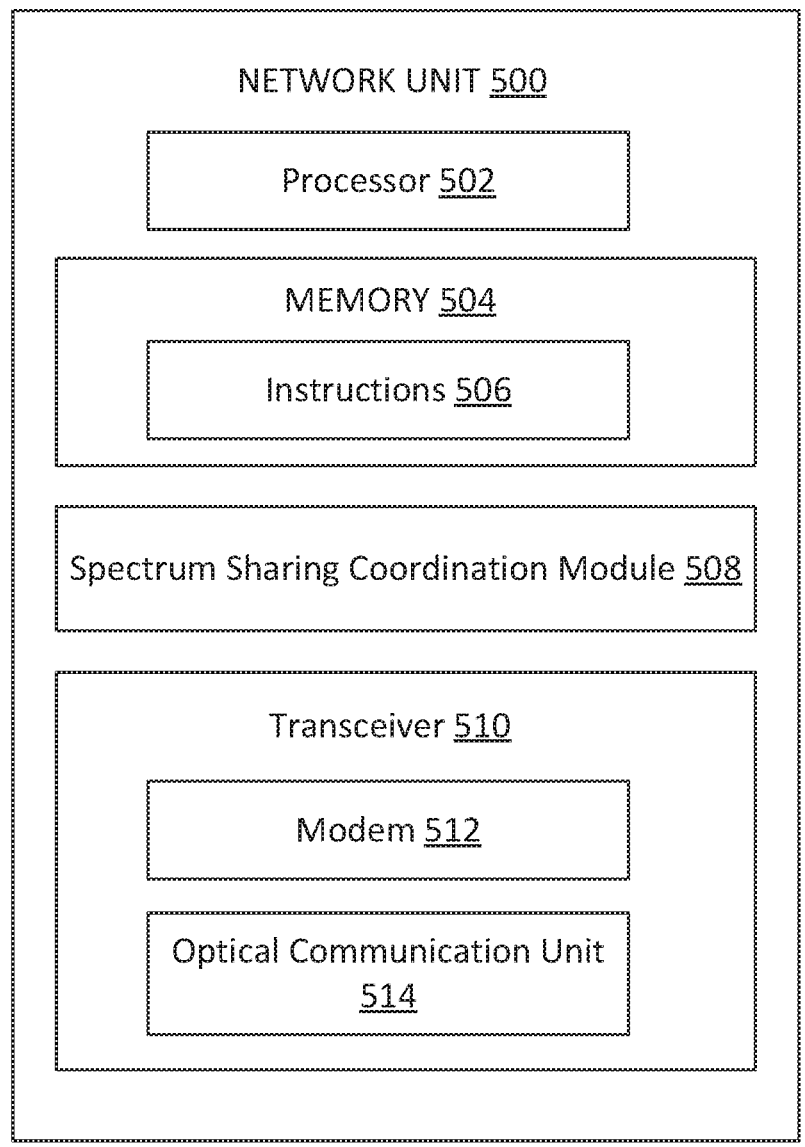
FIG. 5 is a block diagram of a network unit according to some embodiments of the present disclosure.

FIG. 5 illustrates a block diagram of an exemplary network unit 500 according to embodiments of the present disclosure. The network unit 500 may be a spectrum resource control unit 250 as discussed above in FIG. 2. As shown, the network unit 500 may include a processor 502, a memory 504, a spectrum sharing coordination module 508, and a transceiver 510 including a modem subsystem 512 and an optical communication unit 514. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 6-11. Instructions 506 may also be referred to as code, which may be interpreted broadly to include any type of computer-readable statement(s) as discussed above with respect to FIG. 3.

The spectrum sharing coordination module 508 may be implemented via hardware, software, or combinations thereof. For example, the spectrum sharing coordination module 508 may be implemented as a processor, circuit, and/or instructions 506 stored in the memory 504 and executed by the processor 502. The spectrum sharing coordination module 508 may be used for various aspects of the present disclosure, for example, aspects of FIGS. 6-11. For example, the spectrum sharing coordination module 508 is configured to allocate exclusive resources and shared resources in a spectrum (e.g., the CBRS spectrum) for PAL operators, assign access priorities to the PAL operators for accessing for corresponding shared resources, allocate exclusive resources and shared resources in the spectrum for GAA operators, schedule and/or configure NR channel signals (e.g., SSBs, SI, paging, PRACH, HARQ ACK/NACKs, and/or CSI reporting) for using the exclusive resources, and/or schedule and/or configure NR channel signals (e.g., DCIs, DMRS, CSI-RSs, and/or SRSs) for channel reservations in the shared resources, as described in greater detail herein.

As shown, the transceiver 510 may include the modem subsystem 512 and the optical communication unit 514. The transceiver 510 can be configured to communicate bi-directionally with other devices, such as the BSs and/or another core network element. The modem subsystem 512 may be configured to modulate and/or encode data according to a MCS, e.g., a LDPC coding scheme, a turbo coding scheme, a convolutional coding scheme, etc. In one embodiment, the network unit 500 may communicate with a BS such as the BSs 105, 205, and 400 over an optical link. In such an embodiment, the optical communication unit 514 may include optical electrical-to-optical (E/O) components and/or optical-to-electrical (O/E) components that convert an electrical signal to an optical signal for transmission to a BS and/or receive an optical signal from the BS and convert the optical signal into an electrical signal, respectively. The optical communication unit 514 may be configured to process (e.g., perform analog to digital conversion or digital to analog conversion, optical to electrical conversion or electrical to optical conversion, etc.) modulated/encoded data from the modem subsystem 512 (on outbound transmissions) or of transmissions originating from another source such as a backend or core network. Although shown as integrated together in transceiver 510, the modem subsystem 512 and the optical communication unit 514 may be separate devices that are coupled together at the network unit 500 to enable the network unit 500 to communicate with other devices. The optical communication unit 514 may transmit optical signal carrying the modulated and/or processed data over an optical link. The optical communication unit 514 may further receive optical signals carrying data messages and provide the received data messages for processing and/or demodulation at the transceiver 510. In another embodiment, the network unit 500 may communicate with a BS over a wireless link. In such an embodiment, the optical communication unit 514 may be optional.

Figure 6:
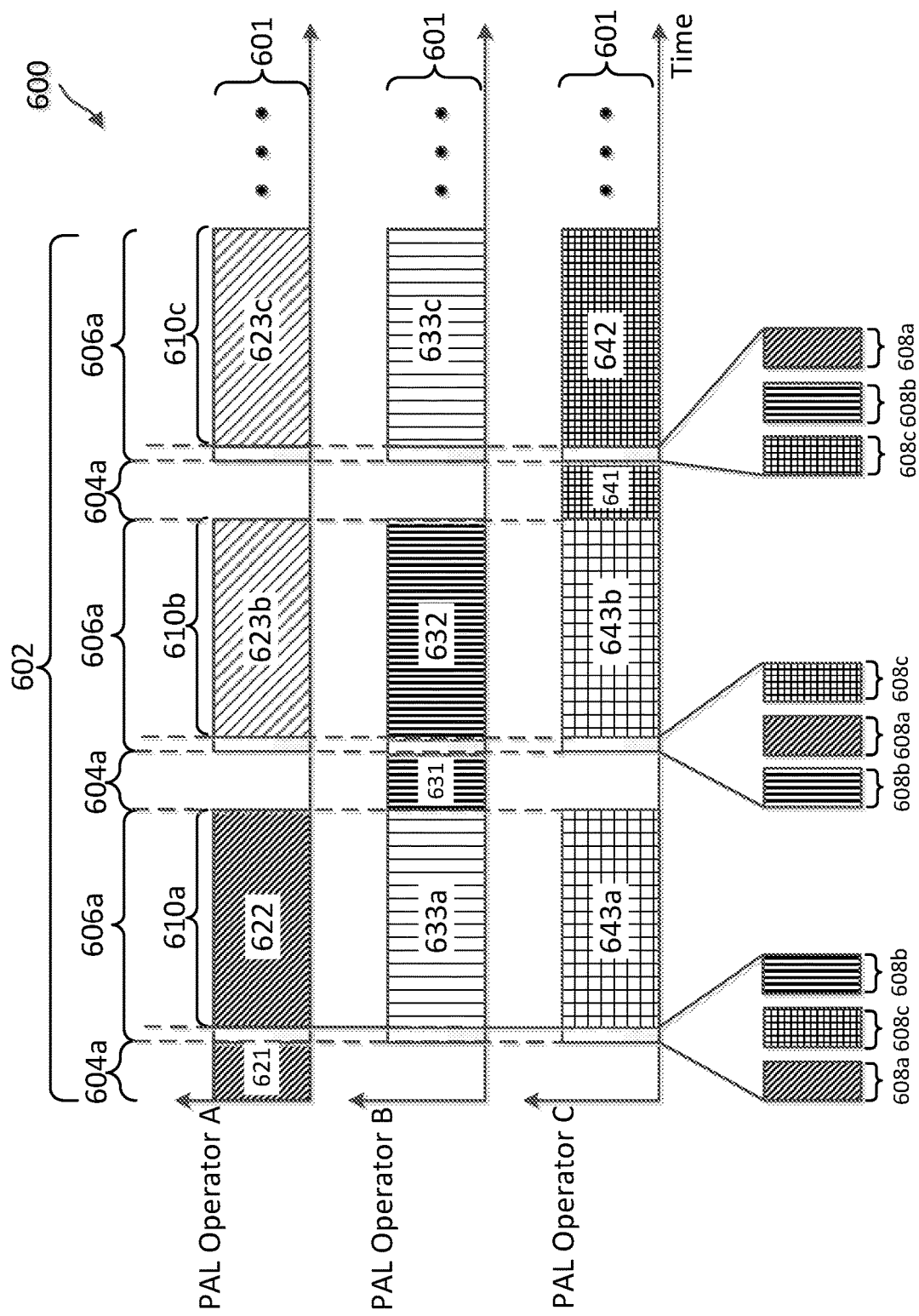
FIG. 6 illustrates a priority access license (PAL) spectrum sharing scheme according to some embodiments of the present disclosure.
Figure 7:
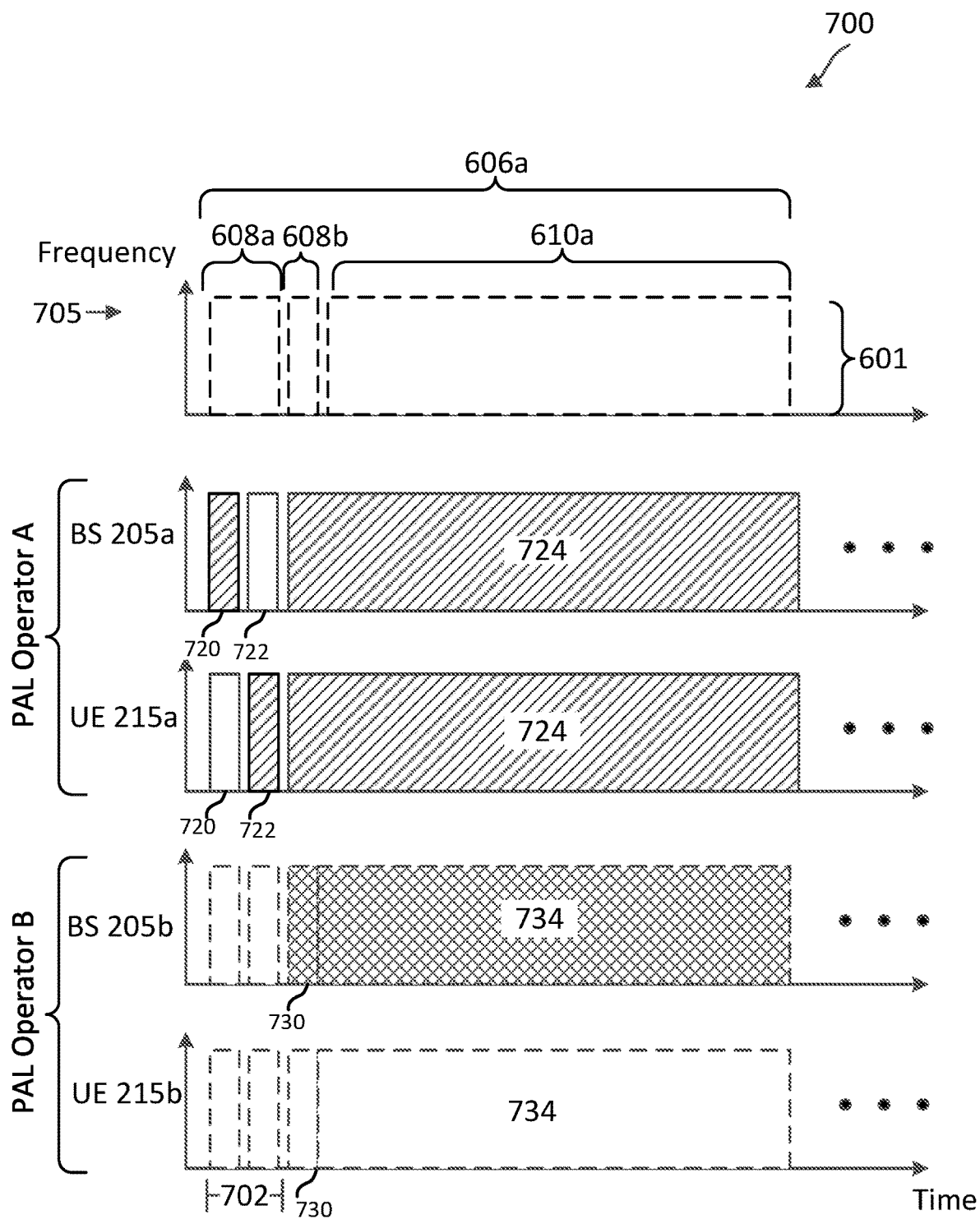
FIG. 7 illustrates a PAL spectrum sharing scheme according to some embodiments of the present disclosure.
Figure 8:
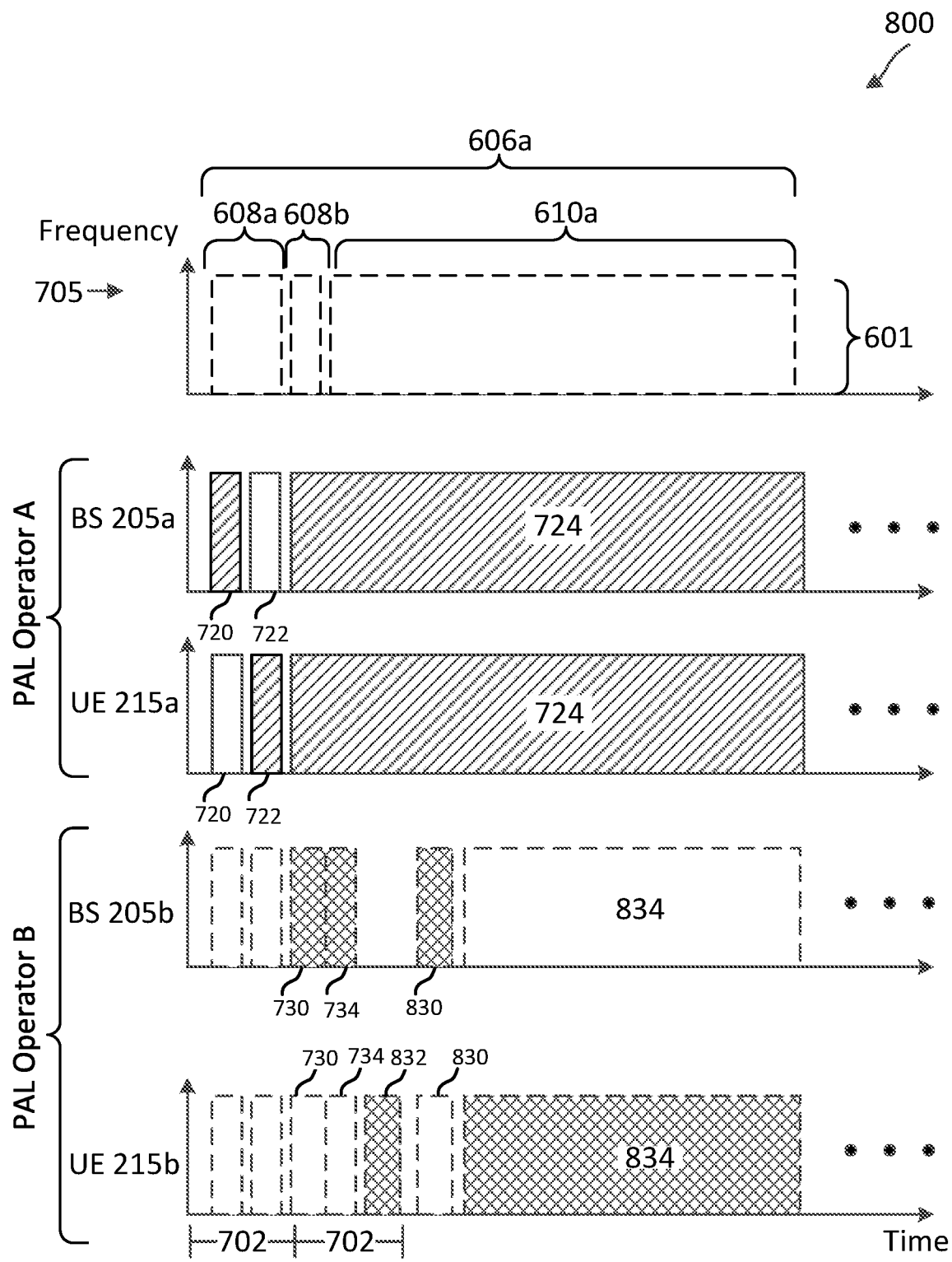
FIG. 8 illustrates a PAL spectrum sharing scheme according to some embodiments of the present disclosure.

FIGS. 6-8 illustrate various mechanisms for coordinating spectrum sharing among PAL operators. In FIGS. 6-8, the x-axes represent time in some constant units and the y-axes represent frequency in some constant units.

FIG. 6 illustrates a PAL spectrum sharing scheme 600 according to some embodiments of the present disclosure. The scheme 600 may be employed by the networks 100 and 200 for spectrum sharing among PAL users or network operating entities. In particular, a spectrum resource control unit such as the spectrum resource control unit 250 and the network unit 500 may configure exclusive resources and prioritized shared access resources for BSs such as the BSs 105, 205, and 400 of PAL operators to communicate with corresponding UEs such as the UEs 115, 215, and 300 using the scheme 600. While the scheme 600 illustrates coordinated spectrum access for three different PAL users or network operating entities (e.g., Operator A, Operator B, and Operator C), the scheme 600 can be applied to any suitable number of network operating entities.

In the scheme 600, the spectrum 601 is time-partitioned into frames 602. The spectrum 601 may be located at any suitable frequencies for shared wireless access by multiple network operating entities. In some examples, the spectrum 601 may be a licensed spectrum. In some examples, the spectrum 601 may be an unlicensed spectrum. In some examples, the spectrum 601 may be located in a 3.5 GHz CBRS band. Each frame 602 is partitioned into exclusive access periods 604 (shown as 604a, 604b, and 604c) and transmit opportunities (TXOPs) 606 (shown as 606a, 606b, and 606c). Each TXOP 606 includes a plurality of CCA periods 608 (shown as 608a, 608b, and 608c) at the beginning of the TXOP 606, followed by a transmission period 610 (shown as 610a, 610b, and 610c). The exclusive access periods 604, the CCA periods 608, and the transmission period 610 may have fixed duration. For example, each exclusive access period 604 may include one or more slots or subframes, each CCA period slot 608 may include one or more OFDM symbols, and each transmission period 610 may include one or more slots or subframes. The spectrum resource control unit can indicate the structure of the frame 602 to all network operating entities sharing the spectrum. The network operating entities may be time-synchronized when operating in the spectrum.

The spectrum resource control unit may assign each exclusive access period 604 to a particular network operating entity for exclusive use. For example, the exclusive access period 604a is designated for exclusive communication 621 by Operator A. Operators B and C are not allowed to transmit during the exclusive access period 604a. Similarly, the exclusive access period 604b is designated for exclusive communication 631 by Operator B, and the exclusive access period 604c is designated for exclusive communication 641 by Operator C.

An operator may use resources in the exclusive time access 604 assigned to the operator for communicating time-critical overhead signals and/or time-critical channel signals. For example, the exclusive communications 621, 631, and 641 can include network information signals (e.g., synchronization signals, SSBs, MIBs, RMSI, and/or OSI), feedback signals (e.g., HARQ ACK/NACKs, and/or CSI reports), paging, and/or PRACH signals of corresponding operators. The exclusive communications 621, 631, and 641 may also be used to provide QoS critical services such as ultra-reliable low-latency communication (URLLC). In an embodiment, the network information signals, feedback signals, paging, PRACH signals, URLLC signals can be as defined in the NR Release 15. The spectrum resource control unit can configure a BS to schedule the network information signals, feedback signals, paging, PRACH signals, URLLC signals in an exclusive access period 604 assigned to the BS.

The spectrum resource control unit can configure the TXOPs 606 for priority-based shared access. For example, the spectrum resource control unit may assign each operator with a priority for accessing each TXOP 606. Each CCA period 608 in a TXOP 606 are arranged in a decreasing priority order. A CCA period 608 may correspond to a slot or a mini-slot. The number of CAA periods 608 in a TXOP 606 may be dependent on the number of network operating entities sharing the spectrum 601. For example, a network with N network operators may include up to N CCA periods 608 in a TXOP 606. Each TXOP 606 is prioritized for use by a highest priority network operating entity and may be utilized by lower priority network operating entities on an opportunistic basis if the prioritized network operating entity does not utilize the resources.

In some embodiments, the spectrum resource control unit may rotate the priorities of the network operating entities (e.g., in a round-robin fashion) among the TXOPs 606 within a frame 602. In some embodiments, the spectrum resource control unit may assign the priorities based on traffic loading and/or requirements of the operators and/or any other pre-agreements with the operators.

As an example, the transmission period 610a is designated for prioritized communication 622 by Operator A and opportunistic communications 633a and 643a by Operators B and C, respectively. The transmission period 610b is designated for prioritized communication 632 by Operator B and opportunistic communications 623b and 643b by Operators A and C, respectively. The transmission period 610c is designated for prioritized communication 642 by Operator C and opportunistic communications 623c and 633c by Operators A and B, respectively. The communications 622 and 623 can include UL control information, UL reference signals, UL data, DL control information, DL reference signals, and/or DL data. While the scheme 600 is described in the context of a spectrum resource control unit coordinating sharing of resource in the spectrum 601 in a time domain, in some embodiments, the spectrum resource control unit can additionally coordinate sharing of the resources in a frequency domain.

FIG. 7 illustrates a PAL spectrum sharing scheme 700 according to some embodiments of the present disclosure. The scheme 700 may be employed by the networks 100 and 200. The scheme 700 is similar to the scheme 600. The scheme 700 provides a more detailed view of interactions between operators using the priority-based shared access described in the scheme 600, and may use the same reference numerals as in FIG. 6 for simplicity sake. FIG. 7 illustrates prioritized shared access between two PAL operators (e.g., Operator A and Operator B), each with one BS serving one UE for simplicity of discussion, though it will be recognized that embodiments of the present disclosure may scale to many more PAL operators 210, each with any suitable number of serving BSs and UEs. For example, Operator A may operate a BS 205a and a UE 215a. Similarly, Operator B may operate a BS 205b and a UE 215b. In FIG. 7, the patterned boxes represent transmit (Tx) signals and the empty boxes represent receive (Rx) signals. The dashed boxes are included to show the transmission and/or reception with reference to a structure 705 of the TXOP 606 (e.g., without signal transmission or reception).

As an example, Operator A has priority over Operator B in the TXOP 606a. The BS 205a may use priority access in the TXOP 606a. The BS 205a transmits a reservation signal 720 in the CCA period 608a of the TXOP 606a to reserve the TXOP 606a for communications. The reservation signal 720 can be a PDCCH signal including downlink control information (DCI), DMRS, and/or CSI-RS. The DCI may include a scheduling grant for the UE 215a. The UE may respond by transmitting a reservation response signal 722. The reservation response signal 722 can be an SRS. Subsequently, the BS 205a may communicate a communication signal 724 with the UE 215a during the transmission period 610a. The scheduling grant can be a DL grant or a UL grant. When the scheduling grant is a DL grant, the communication signal 724 may carry DL data. Conversely, when the scheduling grant is a UL grant, the communication signal 724 may carry UL data.

Since Operator B has a lower priority than Operator A in the TXOP 606a, the BS 205b may monitor the channel (e.g., the spectrum 601) for a reservation signal 720 or a reservation response signal 722 from Operator A during the CCA period 608a assigned to Operator A. The BS 205b may perform the monitoring using energy detection or detection for a particular signal signature (e.g., waveform). In some embodiments, the BS 205b can perform the monitoring based on an LBT threshold such that the BS 205b may not create a dominant interference to Operator A. Upon detecting a reservation signal 720 and/or a reservation response signal 722 from Operator A, the BS 205b may refrain from transmitting in the transmission period 610a. However, when no reservation signal 720 or a reservation response signal 722 is detected from Operator A, the BS 205b may opportunistically transmit a reservation signal 730 in the CCA period 608b to reserve the following transmission period 610a. The reservation signal 730 may can be a PDCCH signal including downlink control information (DCI), DMRS, and/or CSI-RS. The DCI may include a DL grant for the UE 215b. Subsequently, the BS 205b may communicate a DL communication signal 734 with the UE 215b. In an embodiment, the PDCCH signal, DCI, DMRS, and CSI-RS are signals as defined in NR Release 15.

As can be seen, a low-priority operator does not have guarantee access to a TXOP 606. Thus, to guarantee no interference to a high-priority operator, an operator may delay HARQ and/or CSI feedbacks. In NR, a parameter K is defined for the delay between a data reception and the transmission of a HARQ ACK/NACK corresponding to the data reception. Thus, a BS may adjust the value for the parameter K such that HARQ ACK/NACKs can be transmitted using resources with guaranteed access or exclusive access.

In an embodiment, the duration 702 of a CCA period 608 may span one slot or one mini-slot. Thus, when a TXOP 606 includes n slots or n mini-slots, the overhead for a non-primary operator may be about 1/(n−1) slots or 1/(n−1) mini-slots. While the scheme 700 illustrates the BS 205a scheduling the UE 215a for communication over the entire transmission period 610 or the BS 205b scheduling the UE 215b for communication over the entire transmission period 610, in some embodiments, the transmission period 610 may include multiple subframes or slots and a BS may schedule different UEs in different subframes or slots within the transmission period 610.

FIG. 8 illustrates a PAL spectrum sharing scheme 800 according to some embodiments of the present disclosure. The scheme 800 may be employed by the networks 100 and 200. The scheme 800 is described using the frame structure and priority access mechanisms as in the scheme 600. The scheme 800 is substantially similar to the scheme 700, but illustrates an opportunistic access of a shared access resource for UL communication. The scheme 800 may use the same reference numerals as in FIGS. 6 and 7 for simplicity sake. In the scheme 800, a scheduled UE (e.g., the UEs 115, 215, and 300) or an active UE that have data for exchange may also be required to monitor transmissions from other operators in addition to BSs.

For example, similar to the scheme 700, the BS 205b may monitor the channel (e.g., the spectrum 601) for a reservation signal 720 and/or a reservation response signal 722 from Operator A during the CCA period 608a assigned to Operator A. When no reservation signal 720 or no reservation response signal 722 is detected from Operator A, the BS 205b may opportunistically transmit a reservation signal 730 in the CCA period 608b to reserve the following transmission period 610. The reservation signal 730 may include a DL grant for the UE 215b. The BS 205b may communicate a DL communication signal 734 with the UE 215b based on the DL grant.

The reservation signal 730 may also include an SRS request for the UE 215b. The BS 205b may determine whether to schedule the UE 215b for a UL communication based on whether an SRS response is received from the UE 215b. For example, the UE 215b may also listen to the channel for a transmission from another UE. In some embodiments, the UE 215b can perform the monitoring based on an LBT threshold to avoid creating a dominant interference to Operator A. When a transmission is detected from another UE, the UE 215b may not respond to the SRS request. However, when no transmission is detected from another UE, the UE 215b may respond to the SRS request by transmitting an SRS 832. In an embodiment, the SRS 832 is as defined in NRRelease 15. Upon receiving the SRS 832, the BS 205b may schedule the UE 215b for a UL communication. For example, the BS 205b may transmit a DCI signal 830 including a UL grant for the UE 215b in a second slot (e.g., the duration 702) within the TXOP 606a. Subsequently, the UE 215b may transmit a UL communication signal 834 to the BS 205b based on the UL grant.

As can be seen from the schemes 600, 700, and 800, a spectrum resource control unit can coordinate spectrum sharing among PAL operators operating based on NR Release 15 channel signals and/or messages without introducing new messages or new channel signals. As shown in the scheme 700, network listening or channel monitoring from BSs can facilitate reliable spectrum sharing for DL traffic. As shown in the scheme 800, the addition of UE listening can facilitate reliable spectrum sharing for UL traffic in addition to DL traffic. In some embodiments, the UE monitoring can facilitate vehicle-to-everything (V2X) and/or dynamic TDD operations in addition to spectrum sharing.

Figure 9:
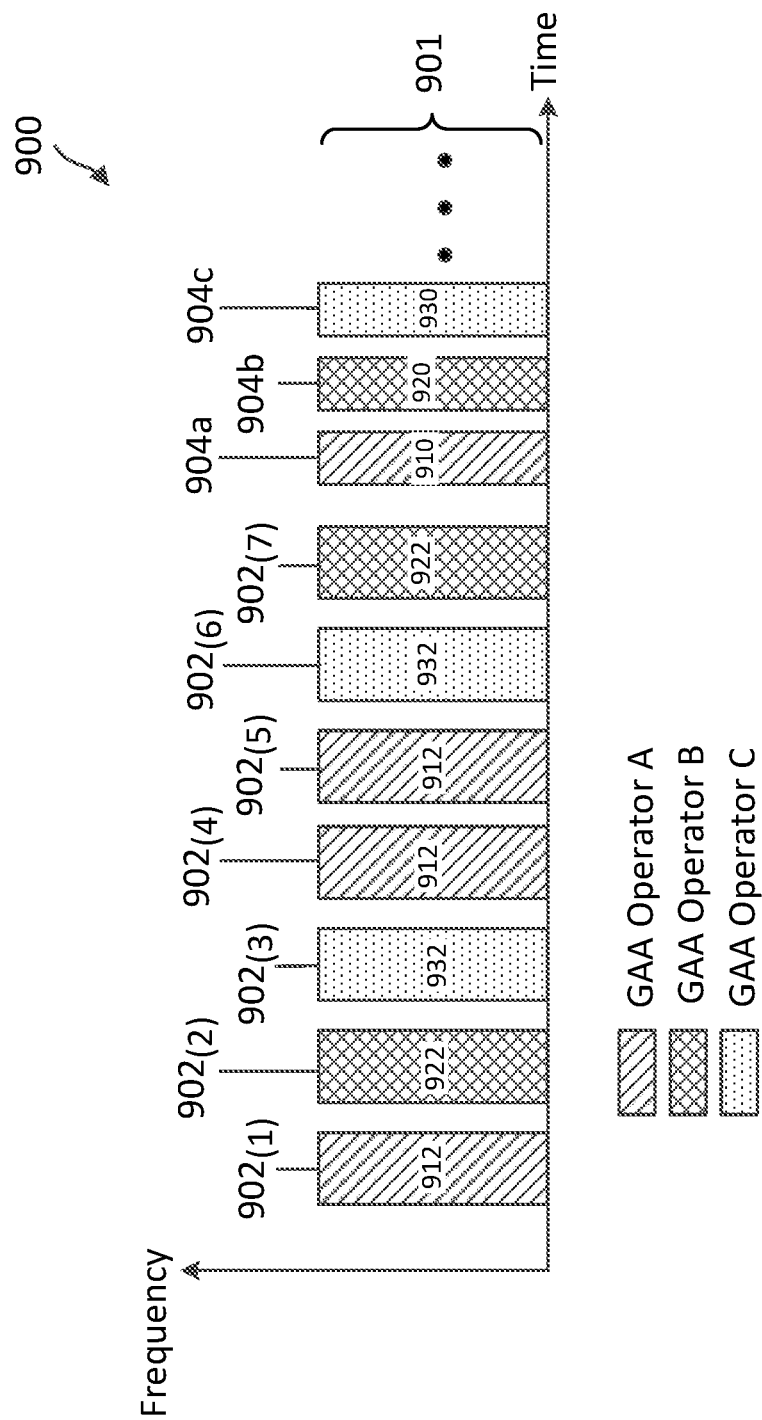
FIG. 9 illustrates a general authorized access (GAA) spectrum sharing scheme according to some embodiments of the present disclosure.

FIG. 9 illustrates a GAA spectrum sharing scheme 900 according to some embodiments of the present disclosure. The scheme 900 may be employed by the networks 100 and 200 for spectrum sharing among GAA users or network operating entities. In particular, a spectrum resource control unit such as the spectrum resource control unit 250 and the network unit 500 may configure exclusive resources and contention-based shared access resources for BSs such as the BSs 105, 205, and 400 of GAA operators to communicate with corresponding UEs such as the UEs 115, 215, and 300 using the scheme 900. While the scheme 900 illustrates coordinated spectrum access for three different GAA users or network operating entities (e.g., Operator A, Operator B, and Operator C), the scheme 900 can be applied to any suitable number of network operating entities.

Similar to the scheme 600, the spectrum resource control unit may allocate certain time periods 904 (shown as 904a, 904b, and 904c) when a network operator may have exclusive access to a spectrum 901 (e.g., the spectrum 601). For example, the exclusive access period 904a is designated for exclusive communication 910 by Operator A. Operators B and C are not allowed to transmit during the exclusive access period 904a. Similarly, the exclusive access period 904b is designated for exclusive communication 920 by Operator B, and the exclusive access period 904c is designated for exclusive communication 930 by Operator C. The exclusive communications 910, 920, and 930 can include network information signals (e.g., synchronization signals, SSBs, MIBs, RMSI, and/or OSI), feedback signals (e.g., HARQ ACK/NACKs, and/or CSI reports), paging, and/or PRACH signals of corresponding operators.

The spectrum resource control unit may configure periods (e.g., a TXOP 902) outside the exclusive access periods 904 for contention-based shared access by the operators. For example, a BS of an operator may perform an LBT in the spectrum 901. When the LBT passes, the BS may gain access to a TXOP 902 in the spectrum 901. The BS may schedule a UE for a UL communication or a DL communication. For example, Operator A may gain access to the TXOPs $902_{(1)}$, $902_{(4)}$, and $902_{(5)}$. Thus, Operator A nodes may communicate communication signals 912 in the TXOPs $902_{(1)}$, $902_{(4)}$, and $902_{(5)}$. Operator B may gain access to the TXOPs $902_{(2)}$ and $902_{(7)}$. Thus, Operator B nodes may communicate communication signals 922 in the TXOPs $902_{(2)}$ and $902_{(7)}$. Operator CB may gain access to the TXOPs $902_{(3)}$ and $902_{(6)}$. Thus, Operator C nodes may communicate communication signals 932 in the TXOPs $902_{(3)}$ and $902_{(6)}$. The communication signals 912, 922, and 923 can be UL and/or DL communication signals of corresponding operators. The communication signals 912, 922, and 923 can include UL control information, UL data, DL control information, and/or DL data.

In some embodiments, nodes from different operators may create some residual interference to each other after executing LBT procedures. To minimize potential residual interference, the spectrum resource control unit can assign orthogonal resources to nearby nodes. While the scheme 900 is described in the context of a spectrum resource control unit coordinating sharing of resource in the spectrum 901 in a time domain, in some embodiments, the spectrum resource control unit can additionally coordinate sharing of the resources in a frequency domain.

Figure 10:
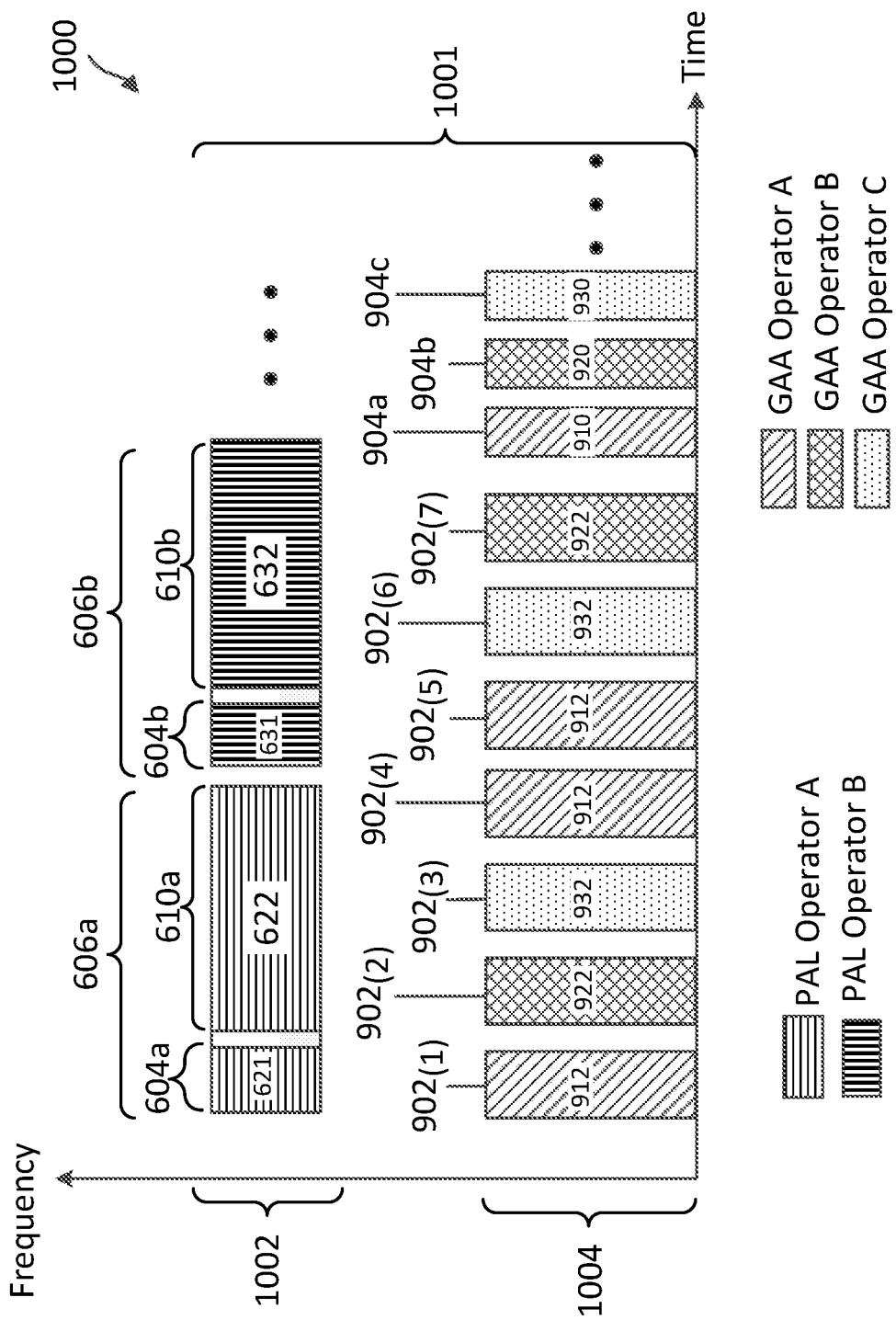
FIG. 10 illustrates an example of a spectrum sharing scheme for sharing between PAL users and GAA users according to some embodiments of the present disclosure.

FIG. 10 illustrates an example of a spectrum sharing scheme 1000 for sharing between PAL users and GAA users according to some embodiments of the present disclosure. The scheme 1000 may be employed by the networks 100 and 200 for spectrum sharing among PAL users and GAA users or network operating entities. In particular, a spectrum resource control unit such as the spectrum resource control unit 250 and the network unit 500 can use the scheme 600 in conjunction with the scheme 900 to coordinate resources for spectrum sharing. The scheme 1000 may use the same reference numerals as in FIGS. 6 and 9 for simplicity sake.

For example, the spectrum resource control unit can configure resources in a portion 1002 of a spectrum 1001 (e.g., the spectrums 601 and/or 901) for PAL operators and configured resources in another portion 1004 of the spectrum 1001 for GAA operators. The spectrum resource control unit can use the scheme 600 to configure the portion 1002 and use the scheme 900 to configure the portion 1004.

Figure 11:
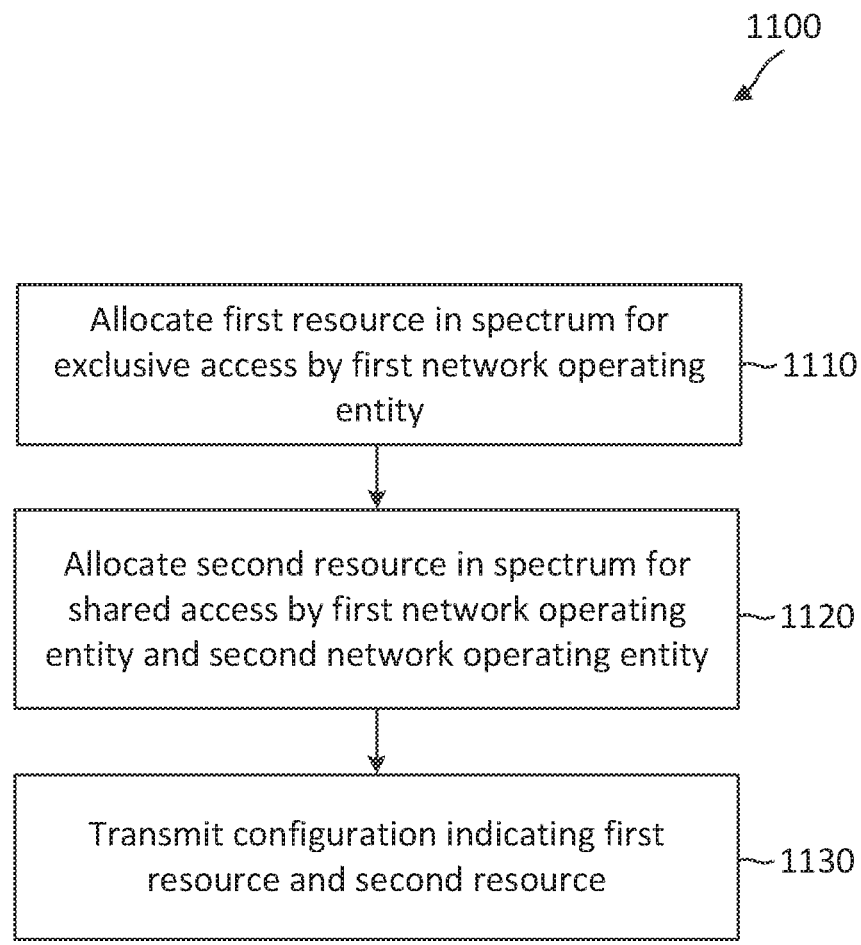
FIG. 11 is a flow diagram of a spectrum sharing coordination method according to embodiments of the present disclosure.

FIG. 11 is a flow diagram of a spectrum sharing coordination method 1100 according to embodiments of the present disclosure. Steps of the method 1100 can be executed by a computing device (e.g., a processor, processing circuit, and/or other suitable component) or other suitable means for performing the steps. For example, a spectrum resource control unit, such as the spectrum resource control unit 250 or the network unit 500, may utilize one or more components, such as the processor 502, the memory 504, the spectrum sharing coordination module 508, and the transceiver 510, to execute the steps of method 1100. The method 1100 may employ similar mechanisms as in the schemes 600, 700, 800, 900, and 1000 described above with respect to FIGS. 6, 7, 8, 9, and 10, respectively. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1110, the method 1100 includes allocating a first resource (e.g., the exclusive access periods 604 and/or 904) in a spectrum (e.g., the spectrums 601, 901, and/or 1001) for exclusive access by a first network operating entity (e.g., Operator A). The spectrum is shared by the first network operating entity and a second network operating entity (e.g., Operator B). The exclusive access is configured for at least one of a network information communication or a feedback communication.

At step 1120, the method 1100 includes allocating a second resource (e.g., the TXOPs 606 and 902) in the spectrum for shared access by the first network operating entity and the second network operating entity. The shared access is configured for at least a downlink control information communication.

At step 1130, the method 1100 includes transmitting, to the first network operating entity and the second network operating entity, a configuration indicating that the first resource is allocated for exclusive access by the first network operating entity and the second resource is allocated for shared access by the first network operating entity and the second network operating entity.

In an embodiment, the network information communication includes at least one of a synchronization signal block (SSB) communication by the first network operating entity or system information (SI) communication by the first network operating entity. In an embodiment, the feedback communication is associated with at least one of a hybrid automatic repeat request (HARQ) acknowledgment/negative-acknowledgement (ACK/NACK) communication by the first network operating entity or a channel state information (CSI) report communication by the first network operating entity. In an embodiment, the exclusive access is further configured for at least one of an ultra-reliable low-latency communication (URLLC) by the first network operating entity, a paging communication by the first network operating entity, or a random-access procedure communication by the first network operating entity.

In an embodiment, the downlink control information communication is configured for includes at least one of a scheduling grant communication by the first network operating entity, a demodulation reference signal (DMRS) communication by the first network operating entity, or a channel state information-reference signal (CSI-RS) communication by the first network operating entity.

In an embodiment, the first network operating entity and the second network operating entity are priority access license (PAL) network operating entities of the spectrum. In such an embodiment, the spectrum resource control unit may assign a first access priority to the first network operating entity for the shared access of the second resource and may assign a second access priority to the second network operating entity for the shared access of the second resource, the second access priority being higher than the first access priority. In an embodiment, the first resource and the second resource are in a first portion of the spectrum. The spectrum resources control unit can further allocate a third resource in a second portion of the spectrum for shared access by a plurality of general authorized access (GAA) network operating entities, where the second portion is different from the first portion. The spectrum resource control unit can further allocate a fourth resource in the second portion of the spectrum for exclusive access by one of the plurality of GAA network operating entities.

Figure 12:
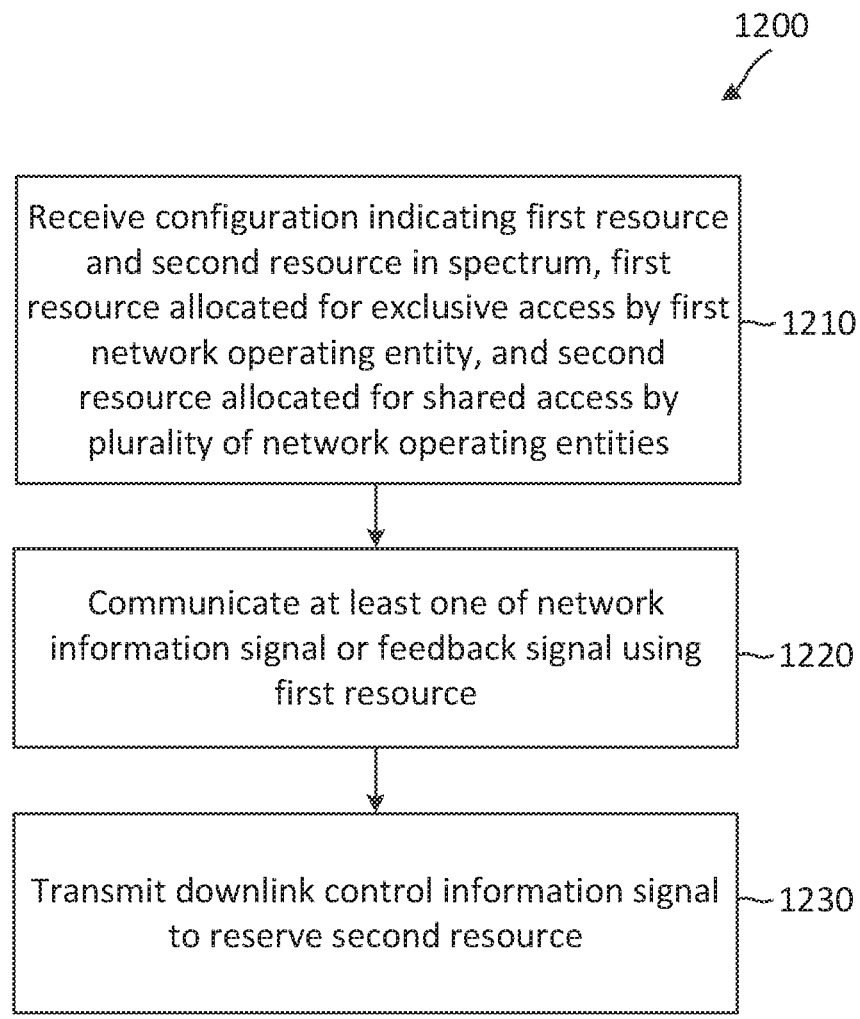
FIG. 12 is a flow diagram of a spectrum sharing method according to embodiments of the present disclosure.

FIG. 12 is a flow diagram of a spectrum sharing method 1200 according to embodiments of the present disclosure. Steps of the method 1200 can be executed by a computing device (e.g., a processor, processing circuit, and/or other suitable component) or other suitable means for performing the steps. For example, a wireless communication device, such as BS 105, BS 205, or BS 400, may utilize one or more components, such as the processor 402, the memory 404, the spectrum sharing module 408, the transceiver 410, and the one or more antennas 416, to execute the steps of method 1200. The method 1200 may employ similar mechanisms as in the schemes 600, 700, 800, 900, and 1000 described above with respect to FIGS. 6, 7, 8, 9, and 10, respectively. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the method 1200 includes receiving, by a first wireless communication device (e.g., a BS), a configuration indicating a first resource (e.g., the exclusive access periods 604 and/or 904) and a second resource (e.g., the TXOPs 606 and 902) in a spectrum (e.g., the spectrums 601, 901, and/or 1001) shared by a first network operating entity (e.g., Operator A) and a second network operating entity (e.g., Operator B). The first resource is allocated for exclusive access by the first network operating entity and the second resource allocated for shared access by the second network operating entity. The first wireless communication device is associated with the first network operating entity.

At step 1220, the method 1200 includes communicating, by the first wireless communication device with a second wireless communication device (e.g., a UE), at least one of a network information or a feedback using the first resource.

At step 1230, the method 1200 includes transmitting, by the first wireless communication device, a downlink control information (e.g., channel reservation signals 720 and 730) to reserve the second resource.

In an embodiment, the network information communication includes at least one of a synchronization signal block (SSB) communication by the first network operating entity or system information (SI) communication by the first network operating entity. In an embodiment, the feedback communication is associated with at least one of a hybrid automatic repeat request (HARQ) acknowledgment/negative-acknowledgement (ACK/NACK) communication by the first network operating entity or a channel state information (CSI) report communication by the first network operating entity. In an embodiment, the exclusive access is further configured for at least one of an ultra-reliable low-latency communication (URLLC) by the first network operating entity, a paging communication by the first network operating entity, or a random-access procedure communication by the first network operating entity.

In an embodiment, the downlink control information communication is configured for includes at least one of a scheduling grant communication by the first network operating entity, a demodulation reference signal (DMRS) communication by the first network operating entity, or a channel state information-reference signal (CSI-RS) communication by the first network operating entity.

In an embodiment, the first wireless communication device can communicate with the second wireless communication device, at least one of an ultra-reliable low-latency communication (URLLC), a paging communication, or a random-access procedure communication using the first resource.

In an embodiment, the first network operating entity is a priority access license (PAL) network operating entity of the spectrum, and wherein the second resource is a priority-based shared resource. In such an embodiment, the configuration may further indicate that the network operating entity has a higher priority than the second network operating entity for accessing the second resource, and wherein the downlink control information is transmitted based on the first network operating entity having the higher priority.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, comprising allocating, by a spectrum resource control unit, a first resource for exclusive access by a first network operating entity in a spectrum shared by the first network operating entity and a second network operating entity, the exclusive access configured for at least one of a network information communication or a feedback communication; allocating, by the spectrum resource control unit, a second resource in the spectrum for shared access by the first network operating entity and the second network operating entity, the shared access configured for at least a downlink control information communication; and transmitting, by the spectrum resource control unit to the first network operating entity and the second network operating entity, a configuration indicating that the first resource is allocated for exclusive access by the first network operating entity and the second resource is allocated for shared access by the first network operating entity and the second network operating entity.

In some embodiments, wherein the network information communication includes at least one of a synchronization signal block (SSB) communication by the first network operating entity or system information (SI) communication by the first network operating entity. In some embodiments, wherein the feedback communication is associated with at least one of a hybrid automatic repeat request (HARQ) acknowledgment/negative-acknowledgement (ACK/NACK) communication by the first network operating entity or a channel state information (CSI) report communication by the first network operating entity. In some embodiments, wherein the exclusive access is further configured for at least one of an ultra-reliable low-latency communication (URLLC) by the first network operating entity, a paging communication by the first network operating entity, or a random-access procedure communication by the first network operating entity. In some embodiments, wherein the downlink control information communication includes at least one of a scheduling grant communication by the first network operating entity, a demodulation reference signal (DMRS) communication by the first network operating entity, or a channel state information-reference signal (CSI-RS) communication by the first network operating entity. In some embodiments, wherein the first network operating entity and the second network operating entity are priority access license (PAL) network operating entities of the spectrum, and wherein the method further comprises assigning, by the spectrum resource control unit, a first access priority to the first network operating entity for the shared access of the second resource; and assigning, by the spectrum resource control unit, a second access priority to the second network operating entity for the shared access of the second resource, the second access priority being higher than the first access priority. In some embodiments, wherein the first network operating entity is a priority access license (PAL) network operating entity of the spectrum, wherein the first resource and the second resource are in a first portion of the spectrum, and wherein the method further comprises allocating, by the spectrum resource control unit, a third resource in a second portion of the spectrum for shared access by a plurality of general authorized access (GAA) network operating entities, the second portion being different from the first portion; and allocating, by the spectrum resource control unit, a fourth resource in the second portion of the spectrum for exclusive access by one of the plurality of GAA network operating entities.

Further embodiments of the present disclosure include a method of wireless communication, comprising receiving, by a first wireless communication device, a configuration indicating a first resource and a second resource in a spectrum shared by a first network operating entity and a second network operating entity, the first resource allocated for exclusive access by the first network operating entity and the second resource allocated for shared access by the second network operating entity, the first wireless communication device associated with the first network operating entity; communicating, by the first wireless communication device with a second wireless communication device, at least one of network information or a feedback using the first resource; and transmitting, by the first wireless communication device, downlink control information to reserve the second resource.

In some embodiments, wherein the network information includes at least one of a synchronization signal block (SSB) associated with the first network operating entity or system information (SI) associated with the first network operating entity. In some embodiments, wherein the feedback is associated with at least one of a hybrid automatic repeat request (HARQ) acknowledgment/negative-acknowledgement (ACK/NACK) or a channel state information (CSI) report. In some embodiments, the method further comprises communicating, by the first wireless communication device with the second wireless communication device, at least one of an ultra-reliable low-latency communication (URLLC), a paging communication, or a random-access procedure communication using the first resource. In some embodiments, wherein the downlink control information includes at least one of a scheduling grant for the second wireless communication device, a demodulation reference signal (DMRS), or a channel state information-reference signal (CSI-RS). In some embodiments, wherein the first network operating entity is a priority access license (PAL) network operating entity of the spectrum, and wherein the second resource is a priority-based shared resource. In some embodiments, wherein the spectrum includes a first portion for sharing among PAL network operating entities and a second portion for sharing among general authorized access (GAA) network operating entities, and wherein the first resource and the second resource are within the first portion. In some embodiments, wherein the configuration further indicates that the network operating entity has a higher priority than the second network operating entity for accessing the second resource, and wherein the downlink control information is transmitted based on the first network operating entity having the higher priority. In some embodiments, wherein the second resource includes a time period including a plurality of priority-based reservation periods, wherein the first network operating entity has a lower priority than the second network operating entity in the time period, wherein the method further includes monitoring, by the first wireless communication device, for a reservation from the second network operating entity during a reservation period of the plurality of priority-based reservation periods corresponding to a priority of the second network operating entity, and wherein the downlink control information is transmitted based on the monitoring. In some embodiments, the method further comprises monitoring, by the first wireless communication device, for a sounding reference signal (SRS) from the second wireless communication device in the second resource; and transmitting, by the first wireless communication device, another downlink control information including an uplink scheduling grant for the second wireless communication device based on the monitoring. In some embodiments, wherein the first network operating entity is a general authorized access (GAA) user of the spectrum. In some embodiments, the method further comprises performing, by the first wireless communication device, a listen-before-talk (LBT) in a time period within the second resource, wherein the downlink control information is transmitted based on the LBT. In some embodiments, wherein the spectrum includes a first portion for sharing among priority access license (PAL) network operating entities and a second portion for sharing among general authorized access (GAA) network operating entities, and wherein the first resource and the second resource are within the second portion.

Further embodiments of the present disclosure include an apparatus comprising a processor configured to allocate a first resource for exclusive access by a first network operating entity in a spectrum shared by the first network operating entity and a second network operating entity, the exclusive access configured for at least one of a network information communication or a feedback communication; and allocate a second resource in the spectrum for shared access by the first network operating entity and the second network operating entity, the shared access configured for at least a downlink control information communication; and a transceiver configured to transmit, to the first network operating entity and the second network operating entity, a configuration indicating that the first resource is allocated for exclusive access by the first network operating entity and the second resource is allocated for shared access by the first network operating entity and the second network operating entity.

In some embodiments, wherein the network information communication includes at least one of a synchronization signal block (SSB) communication by the first network operating entity or system information (SI) communication by the first network operating entity. In some embodiments, wherein the feedback communication is associated with at least one of a hybrid automatic repeat request (HARQ) acknowledgment/negative-acknowledgement (ACK/NACK) communication by the first network operating entity or a channel state information (CSI) report communication by the first network operating entity. In some embodiments, wherein the exclusive access is further configured for at least one of an ultra-reliable low-latency communication (URLLC) by the first network operating entity, a paging communication by the first network operating entity, or a random-access procedure communication by the first network operating entity. In some embodiments, wherein the downlink control information communication includes at least one of a scheduling grant communication by the first network operating entity, a demodulation reference signal (DMRS) communication by the first network operating entity, or a channel state information-reference signal (CSI-RS) communication by the first network operating entity. In some embodiments, wherein the first network operating entity and the second network operating entity are priority access license (PAL) network operating entities of the spectrum, and wherein the processor is further configured to assign a first access priority to the first network operating entity for the shared access of the second resource; and assign a second access priority to the second network operating entity for the shared access of the second resource, the second access priority being higher than the first access priority. In some embodiments, wherein the first network operating entity is a priority access license (PAL) network operating entity of the spectrum, wherein the first resource and the second resource are in a first portion of the spectrum, and wherein the processor is further configured to allocate a third resource in a second portion of the spectrum for shared access by a plurality of general authorized access (GAA) network operating entities, the second portion being different from the first portion; and allocate a fourth resource in the second portion of the spectrum for exclusive access by one of the plurality of GAA network operating entities.

Further embodiments of the present disclosure include an apparatus comprising a transceiver configured to receive a configuration indicating a first resource and a second resource in a spectrum shared by a first network operating entity and a second network operating entity, the first resource allocated for exclusive access by the first network operating entity and the second resource allocated for shared access by the second network operating entity, the apparatus associated with the first network operating entity; communicate, with a wireless communication device, at least one of network information or a feedback using the first resource; and transmit downlink control information to reserve the second resource.

In some embodiments, wherein the network information includes at least one of a synchronization signal block (SSB) associated with the first network operating entity or system information (SI) associated with the first network operating entity. In some embodiments, wherein the feedback is associated with at least one of a hybrid automatic repeat request (HARQ) acknowledgment/negative-acknowledgement (ACK/NACK) or a channel state information (CSI) report. In some embodiments, wherein the transceiver is further configured to communicate, with the wireless communication device, at least one of an ultra-reliable low-latency communication (URLLC), a paging communication, or a random-access procedure communication using the first resource. In some embodiments, wherein the downlink control information includes at least one of a scheduling grant for the wireless communication device, a demodulation reference signal (DMRS), or a channel state information-reference signal (CSI-RS). In some embodiments, wherein the first network operating entity is a priority access license (PAL) network operating entity of the spectrum, and wherein the second resource is a priority-based shared resource. In some embodiments, wherein the spectrum includes a first portion for sharing among PAL network operating entities and a second portion for sharing among general authorized access (GAA) network operating entities, and wherein the first resource and the second resource are within the first portion. In some embodiments, wherein the configuration further indicates that the network operating entity has a higher priority than the second network operating entity for accessing the second resource, and wherein the downlink control information is transmitted based on the first network operating entity having the higher priority. In some embodiments, wherein the second resource includes a time period including a plurality of priority-based reservation periods, wherein the first network operating entity has a lower priority than the second network operating entity in the time period, wherein the apparatus further comprises a processor configured to monitor for a reservation from the second network operating entity during a reservation period of the plurality of priority-based reservation periods corresponding to a priority of the second network operating entity, and wherein the downlink control information is transmitted based on the monitoring. In some embodiments, wherein the processor is further configured to monitor for a sounding reference signal (SRS) from the wireless communication device in the second resource, and wherein the transceiver is further configured to transmit another downlink control information including an uplink scheduling grant for the wireless communication device based on the monitoring. In some embodiments, wherein the first network operating entity is a general authorized access (GAA) user of the spectrum. In some embodiments, the apparatus further comprises a processor configured to perform a listen-before-talk (LBT) in a time period within the second resource, wherein the downlink control information is transmitted based on the LBT. In some embodiments, wherein the spectrum includes a first portion for sharing among priority access license (PAL) network operating entities and a second portion for sharing among general authorized access (GAA) network operating entities, and wherein the first resource and the second resource are within the second portion.

Further embodiments of the present disclosure include a computer-readable medium having program code recorded thereon, the program code comprising code for causing a spectrum resource control unit to allocate a first resource for exclusive access by a first network operating entity in a spectrum shared by the first network operating entity and a second network operating entity, the exclusive access configured for at least one of a network information communication or a feedback communication; code for causing the spectrum resource control unit to allocate a second resource in the spectrum for shared access by the first network operating entity and the second network operating entity, the shared access configured for at least a downlink control information communication; and code for causing the spectrum resource control unit to transmitting, by the spectrum resource control unit to the first network operating entity and the second network operating entity, a configuration indicating that the first resource is allocated for exclusive access by the first network operating entity and the second resource is allocated for shared access by the first network operating entity and the second network operating entity.

In some embodiments, wherein the network information communication includes at least one of a synchronization signal block (SSB) communication by the first network operating entity or system information (SI) communication by the first network operating entity. In some embodiments, wherein the feedback communication is associated with at least one of a hybrid automatic repeat request (HARQ) acknowledgment/negative-acknowledgement (ACK/NACK) communication by the first network operating entity or a channel state information (CSI) report communication by the first network operating entity. In some embodiments, wherein the exclusive access is further configured for at least one of an ultra-reliable low-latency communication (URLLC) by the first network operating entity, a paging communication by the first network operating entity, or a random-access procedure communication by the first network operating entity. In some embodiments, wherein the downlink control information communication includes at least one of a scheduling grant communication by the first network operating entity, a demodulation reference signal (DMRS) communication by the first network operating entity, or a channel state information-reference signal (CSI-RS) communication by the first network operating entity. In some embodiments, wherein the first network operating entity and the second network operating entity are priority access license (PAL) network operating entities of the spectrum, and wherein the computer-readable medium further comprises code for causing the spectrum resource control unit to assign a first access priority to the first network operating entity for the shared access of the second resource; and code for causing the spectrum resource control unit to assign a second access priority to the second network operating entity for the shared access of the second resource, the second access priority being higher than the first access priority. In some embodiments, wherein the first network operating entity is a priority access license (PAL) network operating entity of the spectrum, wherein the first resource and the second resource are in a first portion of the spectrum, and wherein the computer-readable medium further comprises code for causing the spectrum resource control unit to allocate a third resource in a second portion of the spectrum for shared access by a plurality of general authorized access (GAA) network operating entities, the second portion being different from the first portion; and code for causing the spectrum resource control unit to allocate a fourth resource in the second portion of the spectrum for exclusive access by one of the plurality of GAA network operating entities.

Further embodiments of the present disclosure include a computer-readable medium having program code recorded thereon, the program code comprising code for causing a first wireless communication device to receive a configuration indicating a first resource and a second resource in a spectrum shared by a first network operating entity and a second network operating entity, the first resource allocated for exclusive access by the first network operating entity and the second resource allocated for shared access by the second network operating entity, the first wireless communication device associated with the first network operating entity; code for causing the first wireless communication device to communicate, with a second wireless communication device, at least one of network information or a feedback using the first resource; and code for causing the first wireless communication device to transmit downlink control information to reserve the second resource.

In some embodiments, wherein the network information includes at least one of a synchronization signal block (SSB) associated with the first network operating entity or system information (SI) associated with the first network operating entity. In some embodiments, wherein the feedback is associated with at least one of a hybrid automatic repeat request (HARQ) acknowledgment/negative-acknowledgement (ACK/NACK) or a channel state information (CSI) report. In some embodiments, the computer-readable medium further comprises code for causing the first wireless communication device to communicate, with the second wireless communication device, at least one of an ultra-reliable low-latency communication (URLLC), a paging communication, or a random-access procedure communication using the first resource. In some embodiments, wherein the downlink control information includes at least one of a scheduling grant for the second wireless communication device, a demodulation reference signal (DMRS), or a channel state information-reference signal (CSI-RS). In some embodiments, wherein the first network operating entity is a priority access license (PAL) network operating entity of the spectrum, and wherein the second resource is a priority-based shared resource. In some embodiments, wherein the spectrum includes a first portion for sharing among PAL network operating entities and a second portion for sharing among general authorized access (GAA) network operating entities, and wherein the first resource and the second resource are within the first portion. In some embodiments, wherein the configuration further indicates that the network operating entity has a higher priority than the second network operating entity for accessing the second resource, and wherein the downlink control information is transmitted based on the first network operating entity having the higher priority. In some embodiments, wherein the second resource includes a time period including a plurality of priority-based reservation periods, wherein the first network operating entity has a lower priority than the second network operating entity in the time period, wherein the computer-readable medium further includes code for causing the first wireless communication device to monitor for a reservation from the second network operating entity during a reservation period of the plurality of priority-based reservation periods corresponding to a priority of the second network operating entity, and wherein the downlink control information is transmitted based on the monitoring. In some embodiments, the computer-readable medium further comprises code for causing the first wireless communication device to monitor for a sounding reference signal (SRS) from the second wireless communication device in the second resource; and code for causing the first wireless communication device to transmit another downlink control information including an uplink scheduling grant for the second wireless communication device based on the monitoring. In some embodiments, wherein the first network operating entity is a general authorized access (GAA) user of the spectrum. In some embodiments, the computer-readable medium further comprises code for causing the first wireless communication device to perform a listen-before-talk (LBT) in a time period within the second resource, wherein the downlink control information is transmitted based on the LBT. In some embodiments, wherein the spectrum includes a first portion for sharing among priority access license (PAL) network operating entities and a second portion for sharing among general authorized access (GAA) network operating entities, and wherein the first resource and the second resource are within the second portion.

Further embodiments of the present disclosure include an apparatus comprising means for allocating a first resource for exclusive access by a first network operating entity in a spectrum shared by the first network operating entity and a second network operating entity, the exclusive access configured for at least one of a network information communication or a feedback communication; means for allocating a second resource in the spectrum for shared access by the first network operating entity and the second network operating entity, the shared access configured for at least a downlink control information communication; and means for transmitting, to the first network operating entity and the second network operating entity, a configuration indicating that the first resource is allocated for exclusive access by the first network operating entity and the second resource is allocated for shared access by the first network operating entity and the second network operating entity.

In some embodiments, wherein the network information communication includes at least one of a synchronization signal block (SSB) communication by the first network operating entity or system information (SI) communication by the first network operating entity. In some embodiments, wherein the feedback communication is associated with at least one of a hybrid automatic repeat request (HARQ) acknowledgment/negative-acknowledgement (ACK/NACK) communication by the first network operating entity or a channel state information (CSI) report communication by the first network operating entity. In some embodiments, wherein the exclusive access is further configured for at least one of an ultra-reliable low-latency communication (URLLC) by the first network operating entity, a paging communication by the first network operating entity, or a random-access procedure communication by the first network operating entity. In some embodiments, wherein the downlink control information communication includes at least one of a scheduling grant communication by the first network operating entity, a demodulation reference signal (DMRS) communication by the first network operating entity, or a channel state information-reference signal (CSI-RS) communication by the first network operating entity. In some embodiments, wherein the first network operating entity and the second network operating entity are priority access license (PAL) network operating entities of the spectrum, and wherein the apparatus further comprises means for assigning a first access priority to the first network operating entity for the shared access of the second resource; and means for assigning a second access priority to the second network operating entity for the shared access of the second resource, the second access priority being higher than the first access priority. In some embodiments, wherein the first network operating entity is a priority access license (PAL) network operating entity of the spectrum, wherein the first resource and the second resource are in a first portion of the spectrum, and wherein the apparatus further comprises means for allocating a third resource in a second portion of the spectrum for shared access by a plurality of general authorized access (GAA) network operating entities, the second portion being different from the first portion; and means for allocating a fourth resource in the second portion of the spectrum for exclusive access by one of the plurality of GAA network operating entities.

Further embodiments of the present disclosure include an apparatus comprising means for receiving a configuration indicating a first resource and a second resource in a spectrum shared by a first network operating entity and a second network operating entity, the first resource allocated for exclusive access by the first network operating entity and the second resource allocated for shared access by the second network operating entity, the apparatus associated with the first network operating entity; means for communicating, with a wireless communication device, at least one of network information or a feedback using the first resource; and means for transmitting downlink control information to reserve the second resource.

In some embodiments, wherein the network information includes at least one of a synchronization signal block (SSB) associated with the first network operating entity or system information (SI) associated with the first network operating entity. In some embodiments, wherein the feedback is associated with at least one of a hybrid automatic repeat request (HARQ) acknowledgment/negative-acknowledgement (ACK/NACK) or a channel state information (CSI) report.

In some embodiments, the apparatus further comprises means for communicating, with the wireless communication device, at least one of an ultra-reliable low-latency communication (URLLC), a paging communication, or a random-access procedure communication using the first resource. In some embodiments, wherein the downlink control information includes at least one of a scheduling grant for the wireless communication device, a demodulation reference signal (DMRS), or a channel state information-reference signal (CSI-RS). In some embodiments, wherein the first network operating entity is a priority access license (PAL) network operating entity of the spectrum, and wherein the second resource is a priority-based shared resource. In some embodiments, wherein the spectrum includes a first portion for sharing among PAL network operating entities and a second portion for sharing among general authorized access (GAA) network operating entities, and wherein the first resource and the second resource are within the first portion. In some embodiments, wherein the configuration further indicates that the network operating entity has a higher priority than the second network operating entity for accessing the second resource, and wherein the downlink control information is transmitted based on the first network operating entity having the higher priority. In some embodiments, wherein the second resource includes a time period including a plurality of priority-based reservation periods, wherein the first network operating entity has a lower priority than the second network operating entity in the time period, wherein the apparatus further includes means for monitoring for a reservation from the second network operating entity during a reservation period of the plurality of priority-based reservation periods corresponding to a priority of the second network operating entity, and wherein the downlink control information is transmitted based on the monitoring. In some embodiments, the apparatus further comprises means for monitoring for a sounding reference signal (SRS) from the wireless communication device in the second resource; and means for transmitting another downlink control information including an uplink scheduling grant for the wireless communication device based on the monitoring. In some embodiments, wherein the first network operating entity is a general authorized access (GAA) user of the spectrum. In some embodiments, the apparatus further comprises means for performing a listen-before-talk (LBT) in a time period within the second resource, wherein the downlink control information is transmitted based on the LBT. In some embodiments, wherein the spectrum includes a first portion for sharing among priority access license (PAL) network operating entities and a second portion for sharing among general authorized access (GAA) network operating entities, and wherein the first resource and the second resource are within the second portion.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
    receiving, by a first wireless communication device, a configuration indicating a first resource and a second resource in a spectrum shared by a first network operating entity and a second network operating entity, the first resource allocated for exclusive access by the first network operating entity and the second resource allocated for shared access by the second network operating entity, the first wireless communication device associated with the first network operating entity, wherein the second resource includes a plurality of priority-based reservation periods and the first network operating entity has a lower priority access to the second resource than the second network operating entity during a first priority-based reservation period of the plurality of priority-based reservation periods;
    communicating, by the first wireless communication device with a second wireless communication device, at least one of network information or a feedback using the first resource; and
    transmitting, by the first wireless communication device, downlink control information to reserve the second resource.

2. The method of claim 1, wherein the network information includes at least one of a synchronization signal block (SSB) associated with the first network operating entity or system information (SI) associated with the first network operating entity.

3. The method of claim 1, wherein the feedback is associated with at least one of a hybrid automatic repeat request (HARQ) acknowledgment/negative-acknowledgement (ACK/NACK) or a channel state information (CSI) report.

4. The method of claim 1, further comprising:
    communicating, by the first wireless communication device with the second wireless communication device, at least one of an ultra-reliable low-latency communication (URLLC), a paging communication, or a random-access procedure communication using the first resource.

5. The method of claim 1, wherein the downlink control information includes at least one of a scheduling grant for the second wireless communication device, a demodulation reference signal (DMRS), or a channel state information-reference signal (CSI-RS).

6. The method of claim 1, wherein the first network operating entity is a priority access license (PAL) network operating entity of the spectrum, wherein the configuration further indicates that the first network operating entity has a higher priority than the second network operating entity for accessing the second resource during a second priority-based reservation period of the plurality of priority-based reservation periods, wherein the second priority-based reservation period is different from the first priority-based reservation period, and wherein the downlink control information is transmitted based on the first network operating entity having the higher priority.

7. The method of claim 1, wherein the first network operating entity is a priority access license (PAL) network operating entity of the spectrum, wherein the method further includes:
    monitoring, by the first wireless communication device, for a reservation from the second network operating entity during a reservation period of the plurality of priority-based reservation periods corresponding to a priority of the second network operating entity, and wherein the downlink control information is transmitted based on the monitoring.

8. The method of claim 7, further comprising:
monitoring, by the first wireless communication device, for a sounding reference signal (SRS) from the second wireless communication device in the second resource; and
transmitting, by the first wireless communication device, another downlink control information including an uplink scheduling grant for the second wireless communication device based on the monitoring.

9. The method of claim 1, wherein:
the first network operating entity is a general authorized access (GAA) user of the spectrum,
the method further comprises:
performing, by the first wireless communication device, a listen-before-talk (LBT) in a time period within the second resource, and
wherein the downlink control information is transmitted based on the LBT.

10. The method of claim 1, wherein the spectrum includes a first portion for sharing among priority access license (PAL) network operating entities and a second portion for sharing among general authorized access (GAA) network operating entities, and wherein the first resource and the second resource are within at least one of the first portion or the second portion.

11. An apparatus comprising:
a transceiver configured to:
receive a configuration indicating a first resource and a second resource in a spectrum shared by a first network operating entity and a second network operating entity, the first resource allocated for exclusive access by the first network operating entity and the second resource allocated for shared access by the second network operating entity, the apparatus associated with the first network operating entity, wherein the second resource includes a plurality of priority-based reservation periods and the first network operating entity has a lower priority access to the second resource than the second network operating entity during a first priority-based reservation period of the plurality of priority-based reservation periods;
communicate, with a wireless communication device, at least one of network information or a feedback using the first resource; and
transmit downlink control information to reserve the second resource.

12. The apparatus of claim 11, wherein the transceiver configured to communicate the at least one of the network information or the feedback is further configured to:
communicate at least one of a synchronization signal block (SSB) associated with the first network operating entity, system information (SI) associated with the first network operating entity, or the feedback associated with at least one of a hybrid automatic repeat request (HARD) acknowledgment/negative-acknowledgement (ACK/NACK) or a channel state information (CSI) report, and
wherein the transceiver configured to transmit the downlink control information is further configured to:
transmit at least one of a scheduling grant for the wireless communication device, a demodulation reference signal (DMRS), or a channel state information-reference signal (CSI-RS).

13. The apparatus of claim 11, wherein the transceiver is further configured to:
communicate, with the wireless communication device, at least one of an ultra-reliable low-latency communication (URLLC), a paging communication, or a random-access procedure communication using the first resource.

14. The apparatus of claim 11, wherein the first network operating entity is a priority access license (PAL) network operating entity of the spectrum, wherein the configuration further indicates that the first network operating entity has a higher priority than the second network operating entity for accessing the second resource during a second priority-based reservation period of the plurality of priority-based reservation periods, wherein the second priority-based reservation period is different from the first priority-based reservation period, and wherein the downlink control information is transmitted based on the first network operating entity having the higher priority.

15. The apparatus of claim 11, wherein the first network operating entity is a priority access license (PAL) network operating entity of the spectrum, wherein the apparatus further comprises a processor configured to:
monitor for a reservation from the second network operating entity during a reservation period of the plurality of priority-based reservation periods corresponding to a priority of the second network operating entity, and
wherein the downlink control information is transmitted based on the monitoring.

16. The apparatus of claim 15, wherein the processor is further configured to monitor for a sounding reference signal (SRS) from the wireless communication device in the second resource, and wherein the transceiver is further configured to transmit another downlink control information including an uplink scheduling grant for the wireless communication device based on the monitoring.

17. The apparatus of claim 11, wherein the first network operating entity is a general authorized access (GAA) user of the spectrum, and wherein the apparatus further comprises a processor configured to:
perform a listen-before-talk (LBT) in a time period within the second resource, wherein the downlink control information is transmitted based on the LBT.

18. The apparatus of claim 11, wherein the spectrum includes a first portion for sharing among priority access license (PAL) network operating entities and a second portion for sharing among general authorized access (GAA) network operating entities, and wherein the first resource and the second resource are within at least one of the first portion or the second portion.

19. A non-transitory computer-readable medium having program code recorded thereon, the program code comprising:
code for causing a first wireless communication device to receive a configuration indicating a first resource and a second resource in a spectrum shared by a first network operating entity and a second network operating entity, the first resource allocated for exclusive access by the first network operating entity and the second resource allocated for shared access by the second network operating entity, the first wireless communication device associated with the first network operating entity, wherein the second resource includes a plurality of priority-based reservation periods and the first network operating entity has a lower priority access to the second resource than the second network operating entity during a first priority-based reservation period of the plurality of priority-based reservation periods;
code for causing the first wireless communication device to communicate, with a second wireless communication device, at least one of network information or a feedback using the first resource; and code for causing the first wireless communication device to transmit downlink control information to reserve the second resource.

20. The non-transitory computer-readable medium of claim 19, wherein the code for causing the first wireless communication device to communicate the at least one of the network information or the feedback is further configured to:

communicate at least one of a synchronization signal block (SSB) associated with the first network operating entity, system information (SI) associated with the first network operating entity, or the feedback associated with at least one of a hybrid automatic repeat request (HARD) acknowledgment/negative-acknowledgement (ACK/NACK) or a channel state information (CSI) report, and wherein the code for causing the first wireless communication device to transmit the downlink control information is further configured to:

transmit at least one of a scheduling grant for the second wireless communication device, a demodulation reference signal (DMRS), or a channel state information-reference signal (CSI-RS).

* * * * *